United States Patent
Uyeda et al.

(10) Patent No.: US 10,776,530 B2
(45) Date of Patent: Sep. 15, 2020

(54) METHODS AND APPARATUS TO GENERATE AN AIRCRAFT SYSTEM MODEL USING A STANDARDIZED ARCHITECTURE

(71) Applicant: The Boeing Company, Chicago, IL (US)

(72) Inventors: Christopher M. Uyeda, Seattle, WA (US); Steven M. Walstrom, Lynnwood, WA (US); Timothy E. Jackson, Mukilteo, WA (US); Gary L. Andelin, Stanwood, WA (US); William P. Hansen, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 413 days.

(21) Appl. No.: 15/788,396

(22) Filed: Oct. 19, 2017

(65) Prior Publication Data
US 2019/0121934 A1    Apr. 25, 2019

(51) Int. Cl.
  *G06G 7/48*   (2006.01)
  *G06F 30/15*  (2020.01)
  *G06F 30/20*  (2020.01)
  *B64F 5/00*   (2017.01)
  *G06F 113/28* (2020.01)

(52) U.S. Cl.
  CPC .............. *G06F 30/15* (2020.01); *G06F 30/20* (2020.01); *B64F 5/00* (2013.01); *G06F 2113/28* (2020.01)

(58) Field of Classification Search
  None
  See application file for complete search history.

(56) References Cited

U.S. PATENT DOCUMENTS

| | | | | |
|---|---|---|---|---|
| 9,511,728 | B2* | 12/2016 | Shander | B60R 16/0238 |
| 2010/0076737 | A1* | 3/2010 | Boddy | G05B 17/02 703/6 |
| 2013/0117004 | A1* | 5/2013 | Schultz | G06F 17/5009 703/18 |
| 2015/0019175 | A1* | 1/2015 | Karimi | G06F 17/50 703/1 |
| 2015/0112620 | A1* | 4/2015 | Konig | B60L 58/12 702/63 |

(Continued)

OTHER PUBLICATIONS

Huan Xu Design, Specification, and Synthesis of Aircraft Electric Power Systems Control Logic, California Institute of Technology, 2013 (Year: 2013).*

(Continued)

*Primary Examiner* — Rehana Perveen
*Assistant Examiner* — Cuong V Luu
(74) *Attorney, Agent, or Firm* — Hanley, Flight & Zimmerman, LLC

(57) ABSTRACT

Methods, apparatus, systems, and articles of manufacture are disclosed to generate an aircraft system model using a standardized architecture. An example apparatus includes a model generator to generate an aircraft system model of an aircraft system based on a standardized architecture, a model integrator to integrate the aircraft system model into an integrated aircraft system model, a power sequencer to perform a power sequence test on the integrated aircraft system model, and a report generator to generate a report including a result of the power sequence test.

20 Claims, 12 Drawing Sheets

(56) References Cited

U.S. PATENT DOCUMENTS

2017/0323240 A1\* 11/2017 Johnson ........... G06Q 10/06315
2019/0154462 A1\* 5/2019 Kamel ................ H02J 13/0006

OTHER PUBLICATIONS

Nuzzoet al. A Contract-Based Methodology for Aircraft Electric Power System Deisgn IEEE Access, Jan. 7, 2014 (Year: 2014).\*
Tardy et al. Towards More Optimization for Aicraft Energy Conversion Systems OATAO, Feb. 2015 (Year: 2015).\*

\* cited by examiner

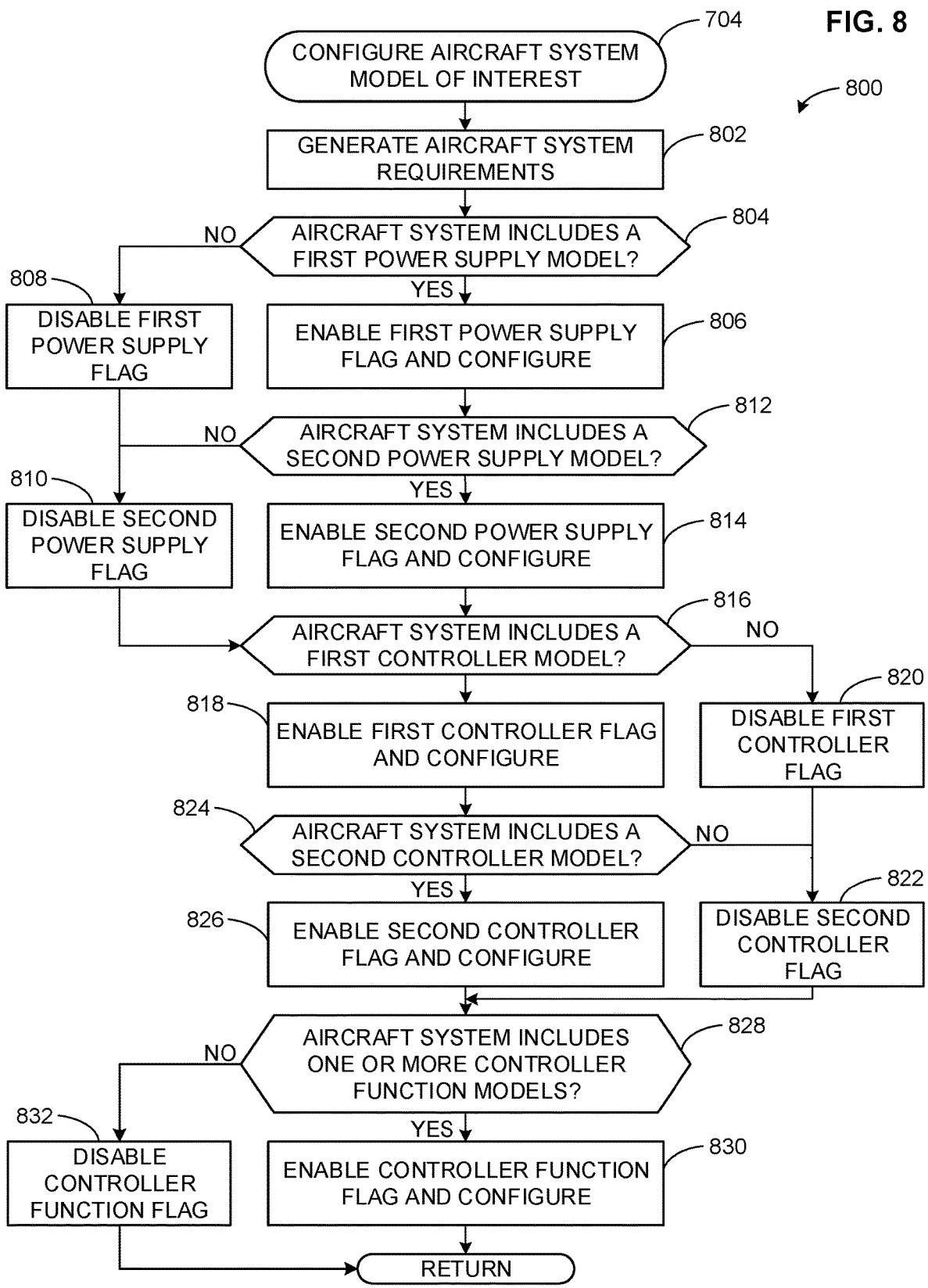

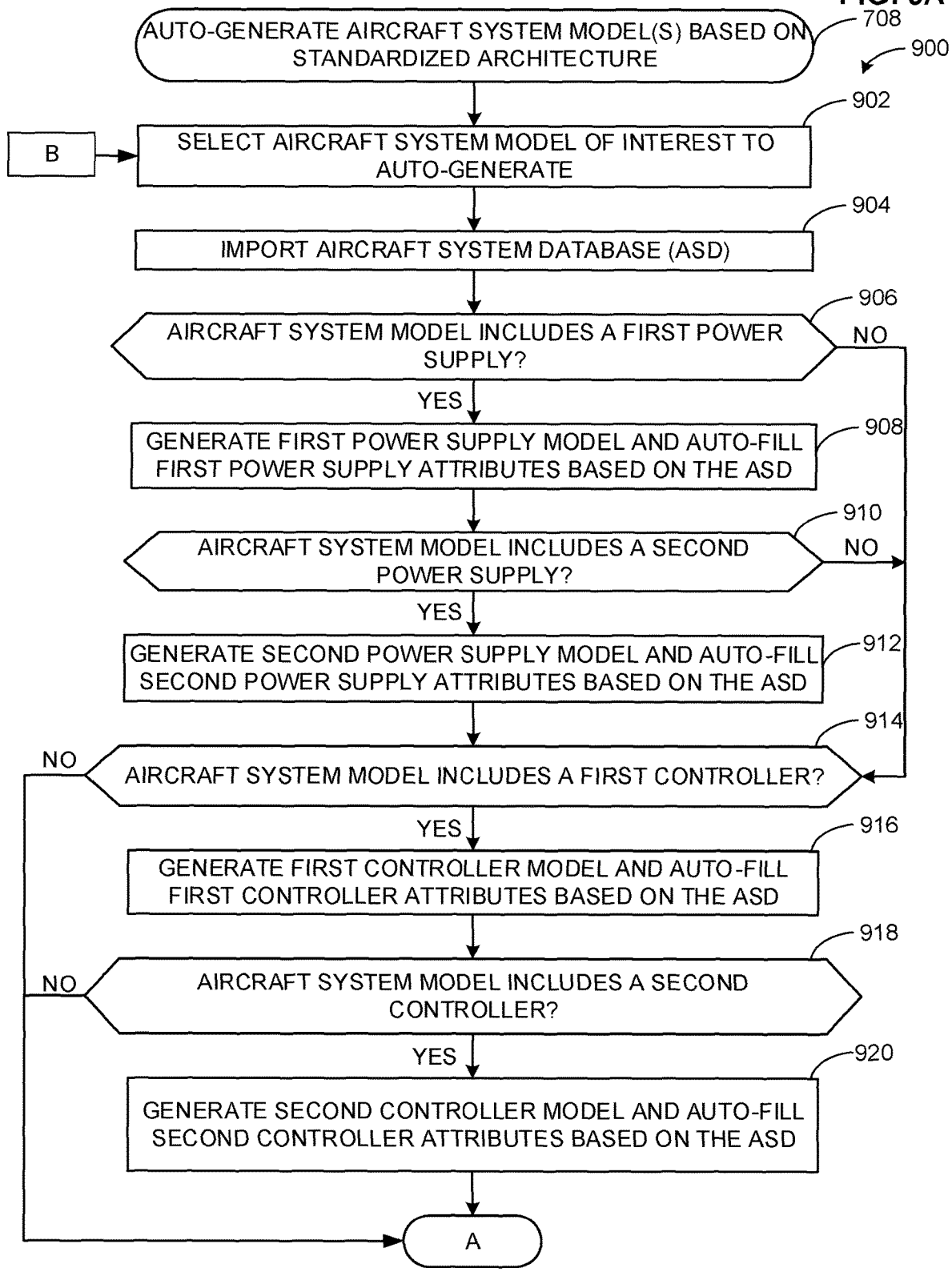

METHODS AND APPARATUS TO GENERATE AN AIRCRAFT SYSTEM MODEL USING A STANDARDIZED ARCHITECTURE

FIELD OF THE DISCLOSURE

This disclosure relates generally to aircraft and, more particularly, to methods and apparatus to generate an aircraft system model using a standardized architecture.

BACKGROUND

In recent years, typical aircraft systems have become increasingly integrated to improve monitoring and operation of the aircraft systems. Managing interfaces between the aircraft systems has become progressively complex. Increased cost can occur due to re-design of the aircraft systems to improve integration inefficiencies discovered during manufacturing and assembly of the aircraft systems. Computer-generated models can be used to evaluate an efficacy of aircraft system designs prior to being released for use in manufacturing.

BRIEF DESCRIPTION OF THE DRAWINGS

FIGS. 7-10 are flowcharts representative of example methods that may be executed by the example aircraft system model simulator of FIGS. 1-2 to simulate an example aircraft system of an example aircraft.

The figures are not to scale. Wherever possible, the same reference numbers will be used throughout the drawing(s) and accompanying written description to refer to the same or like parts.

DETAILED DESCRIPTION

Figure 1:
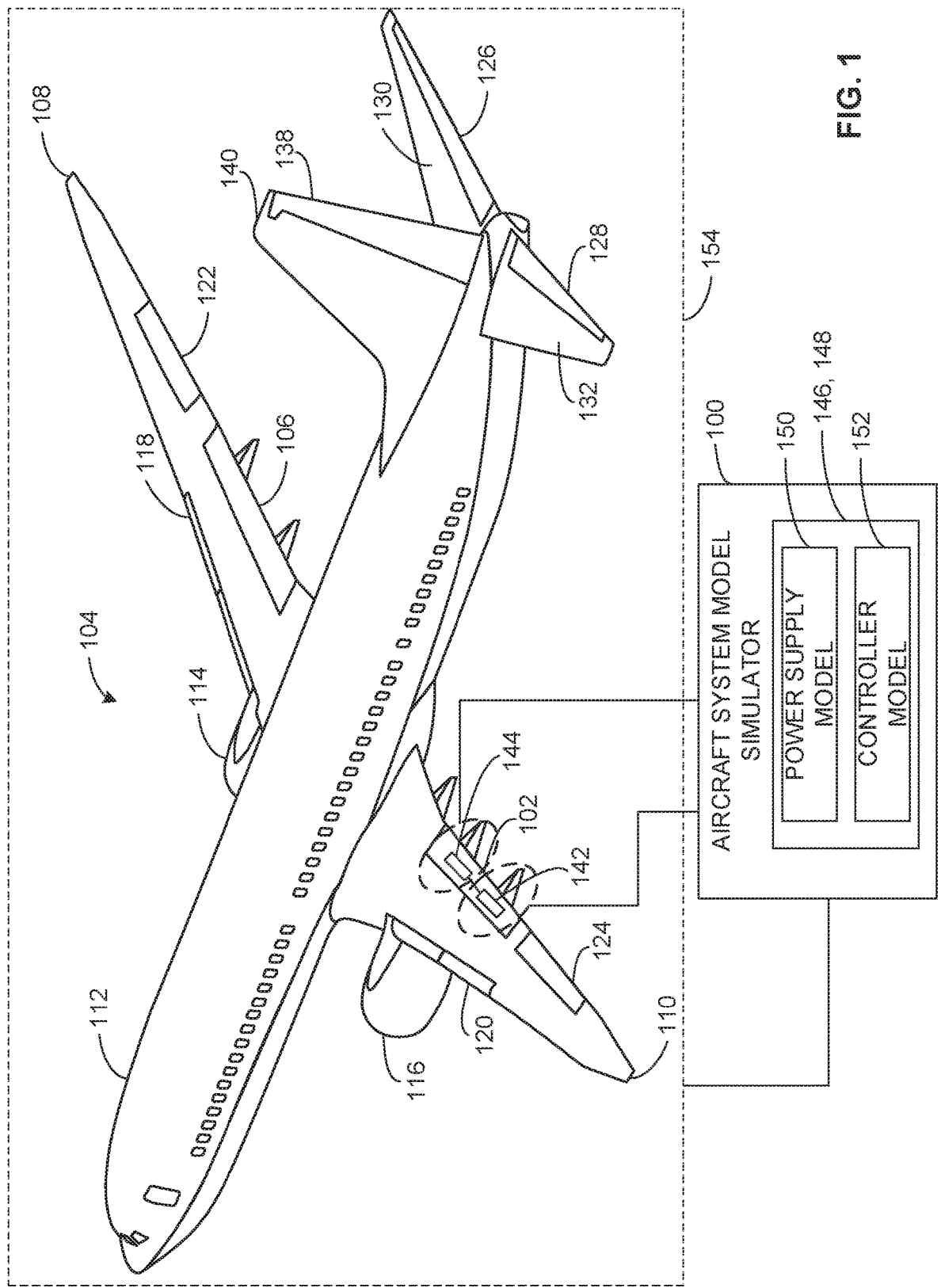
FIG. 1 illustrates an example aircraft system model simulator analyzing an example aircraft system of an example aircraft.

Methods, apparatus, systems, and articles of manufacture to generate an aircraft system model using a standardized architecture are disclosed. An example apparatus includes a model generator to generate an aircraft system model of an aircraft system based on a standardized architecture, a model integrator to integrate the aircraft system model into an integrated aircraft system model, a power sequencer to perform a power sequence test on the integrated aircraft system model, and a report generator to generate a report including a result of the power sequence test.

An example computer implemented method includes generating an aircraft system model of an aircraft system based on a standardized architecture, integrating the aircraft system model into an integrated aircraft system model, performing a power sequence test on the integrated aircraft system model, and generating a report including a result of the power sequence test.

An example non-transitory computer readable storage medium comprising instructions that, when executed, cause a machine to at least generate an aircraft system model of an aircraft system based on a standardized architecture, integrate the aircraft system model into an integrated aircraft system model, perform a power sequence test on the integrated aircraft system model, and generate a report including a result of the power sequence test.

Typical aircraft use highly-integrated aircraft systems to improve monitoring and operation of the aircraft systems. As used herein, the term "aircraft system" refers to a sub-division of an aircraft system (e.g., an electrical system, a mechanical system, an electro-mechanical system, etc., and/or a combination thereof) including one or more coupled (e.g., electrically coupled, electro-mechanically coupled, mechanically coupled, etc.) components (e.g., electrical components, mechanical components, electro-mechanical components, etc.) operative to perform an aircraft function. For example, an aircraft system may correspond to a component such as a motor, a controller, a remote electronics unit, etc.

In another example, an aircraft system may correspond to a system including multiple components such as a trailing-edge flap actuation system used to extend or retract a trailing-edge flap. In such an example, the trailing-edge flap actuation system may include one or more electrically coupled components such as a power supply, a motor, a controller (e.g., a computing device executing machine-readable instructions, a remote electronics unit, etc.), etc. In another example, the trailing-edge flap actuation system may include one or more electrically coupled components such as a power supply, a controller, etc., that control an operation of a hydraulic valve to provide a flow of hydraulic fluid to a hydraulic motor. Additionally or alternatively, the trailing-edge flap actuation system may include one or more mechanically coupled components such as a hydraulic valve controlling a flow of hydraulic fluid, a hydraulic motor, etc.

As typical aircraft systems include an increasing number of electrically-interconnected components, validating a design of the aircraft system becomes complex. For example, designing an aircraft system may include evaluating interfaces and interconnections between the aircraft system and other aircraft systems electrically coupled to the aircraft system. Computer-generated models may be used to analyze the interconnections and validate the aircraft system designs prior to being released for use in manufacturing.

In prior computer-generated model analysis implementations, a use of computer-generated models for analyzing a plurality of interconnected aircraft systems was problematic. For example, a first computer-generated model used to simulate a first aircraft system may have used a different architecture, different analysis criteria, a different timing analysis, etc., compared to a second aircraft system modeled using a second computer-generated model. In such an example, an attempt to successfully integrate the first and the second computer-generated models to validate interconnections between the first and the second aircraft systems was unlikely.

Examples disclosed herein are operative to generate an aircraft system model using a standardized architecture. An example aircraft system model simulator (ASMS) may be used to generate (e.g., automatically generate) one or more models corresponding to one or more aircraft systems. In some examples, the ASMS generates the aircraft system model using a computer-based simulation tool (e.g., MAT-LAB® Simulink®, National Instruments® LABVIEW™, etc.). In some examples, the ASMS generates models for interconnected aircraft systems. For example, the ASMS may generate a first model corresponding to a trailing-edge flap actuation system, a second model corresponding to a motor included in the trailing-edge flap actuation system, a third model corresponding to a controller electrically coupled to the motor included in the trailing-edge flap actuation system, a fourth model corresponding to a remote electronics unit (REU) electrically coupled to controller included in the trailing-edge flap actuation system, etc.

In some examples, the ASMS generates models to perform an analysis (e.g., a Power-Up analysis, a Power-Down analysis, a functional analysis, etc.) of an aircraft system to validate a design of the aircraft system. In some examples, the ASMS performs the analysis using the computer-based simulation tool. For example, the ASMS may generate a model of a controller included in the trailing-edge flap actuation system. In such an example, the controller model may include a power supply model, a controller model, and corresponding controller function models. For example, the ASMS may generate the model using a standardized architecture. As used herein, the term "standardized architecture" refers to an aircraft system model architecture based on generating aircraft system models where like components (e.g., substantially similar components, same component types, etc.) of the aircraft system models are built, configured, designed, etc., using a standardized set of configurable parameters. For example, the ASMS may generate (1) a first aircraft system model including a first power supply model and (2) a second aircraft system model including a second power supply model, where the first and the second power supply models are based on a common set of configurable parameters (e.g., configurable electrical parameters, configurable timing parameters, etc.), in which the configuration is based on the functionality requirements of the first and the second models.

In some examples, the ASMS simulates interconnected aircraft systems by integrating interconnected aircraft system models corresponding to the interconnected aircraft systems. For example, the ASMS may generate each of the interconnected aircraft systems using a standardized approach. For example, the ASMS may generate a first aircraft system model by determining a quantity of power supplies, controllers, and/or controller functions included in the first aircraft system model. In such an example, the ASMS may assign (e.g., automatically assign, automatically fill, etc.) attributes, parameters, etc., to the included power supplies, controllers, etc. In some examples, in response to generating the integrated aircraft system model, the ASMS performs a test (e.g., an integrated aircraft system test, a power sequence, a validation test, etc.) to validate a design corresponding to the interconnected models based on functional metrics, operational thresholds, etc. In some examples, a design of one or more of the aircraft systems can be optimized and/or otherwise improved based on performing the test and analyzing the results.

FIG. 1 illustrates an example aircraft system model simulator (ASMS) 100 simulating a first trailing-edge flap 102 (e.g., a first trailing-edge flap actuation system) 102 operatively coupled to an aircraft 104. The example aircraft 104 includes a second trailing-edge flap 106. The example aircraft 104 includes first and second wings 108, 110 coupled to a fuselage 112. First and second engines 114, 116 are coupled to the wings 108, 110. First and second slats 118, 120 are operatively coupled to the wings 108, 110. Additional aircraft control surfaces of the aircraft 104 include first and second ailerons 122, 124, first and second elevators 126, 128 operatively coupled to first and second horizontal stabilizers 130, 132 and a rudder 138 are operatively coupled to a vertical stabilizer 140.

In the illustrated example of FIG. 1, the first trailing-edge flap 102 includes a motor 142 and a motor controller 144. Additionally or alternatively, the first trailing-edge flap 102 may include any other electrical, mechanical, or electro-mechanical components. The motor 142 of the illustrated example is an electric motor. Alternatively, the example motor 142 may be a hydraulic motor. The motor controller 144 of the illustrated example is a microcontroller-based data acquisition and control device used to monitor and control a motor. For example, the motor controller 144 may obtain sensor data (e.g., a motor rotation speed, a voltage, a current, etc.) from a sensor (e.g., a speed sensor, a voltage sensor, a current sensor, etc.) monitoring the motor 142, execute a calculation or perform an algorithm based on the sensor data, and control a function of the motor 142 based on the execution of the calculation or performing the algorithm.

In the illustrated example of FIG. 1, the ASMS 100 configures and generates a first aircraft system model 146 and a second aircraft system model 148. The first aircraft system model 146 of the illustrated example corresponds to the motor 142. The second aircraft system model 148 of the illustrated example corresponds to the motor controller 144. For example, the ASMS 100 may generate the first aircraft system model 146 to perform an analysis, a validation, etc., of the motor 142 included in the first trailing-edge flap 102. For example, the ASMS 100 may validate a design and an operation of the motor 142 by simulating inputs and outputs of the motor 142 based on configurable parameters of the motor 142 (e.g., a power supply parameter, a control operation parameter, etc.). Additionally or alternatively, the example ASMS 100 may configure and generate an aircraft system model corresponding to any other component such as an actuator included in the first engine 114, an aircraft system such as the first and the second elevators 126, 128, etc.

In the illustrated example, the first and the second aircraft system models 146, 148 include a power supply model 150 and a controller model 152. The power supply model 150 of the illustrated example corresponds to a simulation of power supply parameters (e.g., characteristics of a power input signal, a power output signal, etc.). For example, the power supply model 150 may correspond to a simulation of power supply parameters of the motor 142, the motor controller 144, etc. The controller model 152 of the illustrated example corresponds to a simulation of control operation parameters (e.g., operation states, enabled functions when executing in a specified operation state, etc.). For example, the controller model 152 may correspond to a simulation of control operation parameters of the motor 142, the motor controller 144, etc.

In some examples, the ASMS 100 configures and generates the aircraft system models 146, 148 using a standardized architecture. For example, the standardized architecture may include zero, one, or more power supply models where each one of the power supply models is based on a standard set of configurable parameters. In another example or the same example, the standardized architecture may include zero, one, or more controller models where each one of the controller models is based a standard set of configurable parameters. For example, the first aileron 122 and the first elevator 126 may both include a motor and a controller. In such an example, the ASMS 100 may model the motor and the controller of both the first aileron 122 and the first elevator 126 using the same configurable criteria and configurable parameters (e.g., configurable power input signal parameters, configurable delay on parameters, configurable operation states, configurable enabled functions in a specific operation state, etc.).

In some examples, the ASMS 100 performs a simulated power sequence (e.g., a simulated power-up sequence, a simulated power-down sequence, etc.) of an integrated aircraft system model 154 using the aircraft system models 146, 148 corresponding to the first trailing-edge flap 102. The integrated aircraft system model 154 of the illustrated example corresponds to the aircraft 104. For example, the integrated aircraft system model 154 may include one or more aircraft system models such as the first and the second aircraft system models 146, 148. For example, the ASMS 100 may generate the integrated aircraft system model 154 to perform an analysis, a validation, etc., of a power sequence executed by the aircraft systems (e.g., the first and the second trailing-edge flaps 102, 106, the first and the second engines 114, 116, etc.) included in the aircraft 104. In some examples, the ASMS 100 can integrate the aircraft system models (e.g., the first and the second aircraft system models 146, 148) of the one or more aircraft systems (e.g., the first and the second trailing-edge flaps 102, 106) because the ASMS 100 generates the aircraft system models using a common, a standardized, etc., architecture.

As used herein, the term "power sequence" refers to an order of power operations executed by aircraft system components during a power-up sequence, a power-down sequence, etc. For example, a power sequence may include (1) enabling (turning on) a power supply, (2) powering a controller electrically coupled to the power supply, and (3) the controller activating an electro-hydraulic actuator by enabling a relay. The ASMS 100 may simulate a power sequence of the first aircraft system model 146 of the illustrated example by (1) enabling (turning on) a power input included in the power supply model 150, (2) enabling a controller enable switch included in the controller model 152, and (3) determining one or more functions enabled during an operation state of the controller model 152 using one or more simulations of the one or more functions. The ASMS 100 may simulate a power sequence of the integrated aircraft system model 154 by simulating a power sequence of one or more of the aircraft system models included in the integrated aircraft system model 154 such as the first and the second aircraft system models 146, 148.

In some examples, the ASMS 100 validates an interconnection between aircraft systems (e.g., between the first and the second engines 114, 116) based on simulating a power-up sequence. In some examples, the ASMS 100 determines that electrically coupled aircraft systems can be interfaced without generating a non-responsive or a non-operational condition of one or more components of the electrically coupled aircraft systems. For example, the ASMS 100 may execute a simulation of a power-up sequence of the first and the second aircraft system models 146, 148. For example, the ASMS 100 may determine whether an anticipated voltage input is applied to the motor 142, an anticipated control signal is applied to the motor 142 from the motor controller 144, etc., when the power-up sequence is performed. For example, the ASMS 100 may determine that if the example aircraft 104 were to be physically operated under a set of conditions, the motor 142 could have an insufficient voltage condition by simulating the first trailing-edge flap 102 under the set of conditions.

In some examples, the ASMS 100 can detect a non-responsive condition of one or more aircraft systems of the aircraft 104 based on performing a power sequence using the integrated aircraft system model 154. For example, the ASMS 100 may detect a non-responsive condition of one or more components of the aircraft systems based on simulating a performance of a power sequence by the integrated aircraft system model 154. A design of the one or more aircraft systems may be adjusted to resolve the non-responsive condition based on the detection. For example, by generating aircraft system models of electrically interconnected aircraft systems using a standardized architecture, the generated aircraft system models may be integrated to perform simulations to validate the design of the one or more aircraft systems or indicate areas of improvement of the one or more aircraft systems of the aircraft 104.

Figure 2:
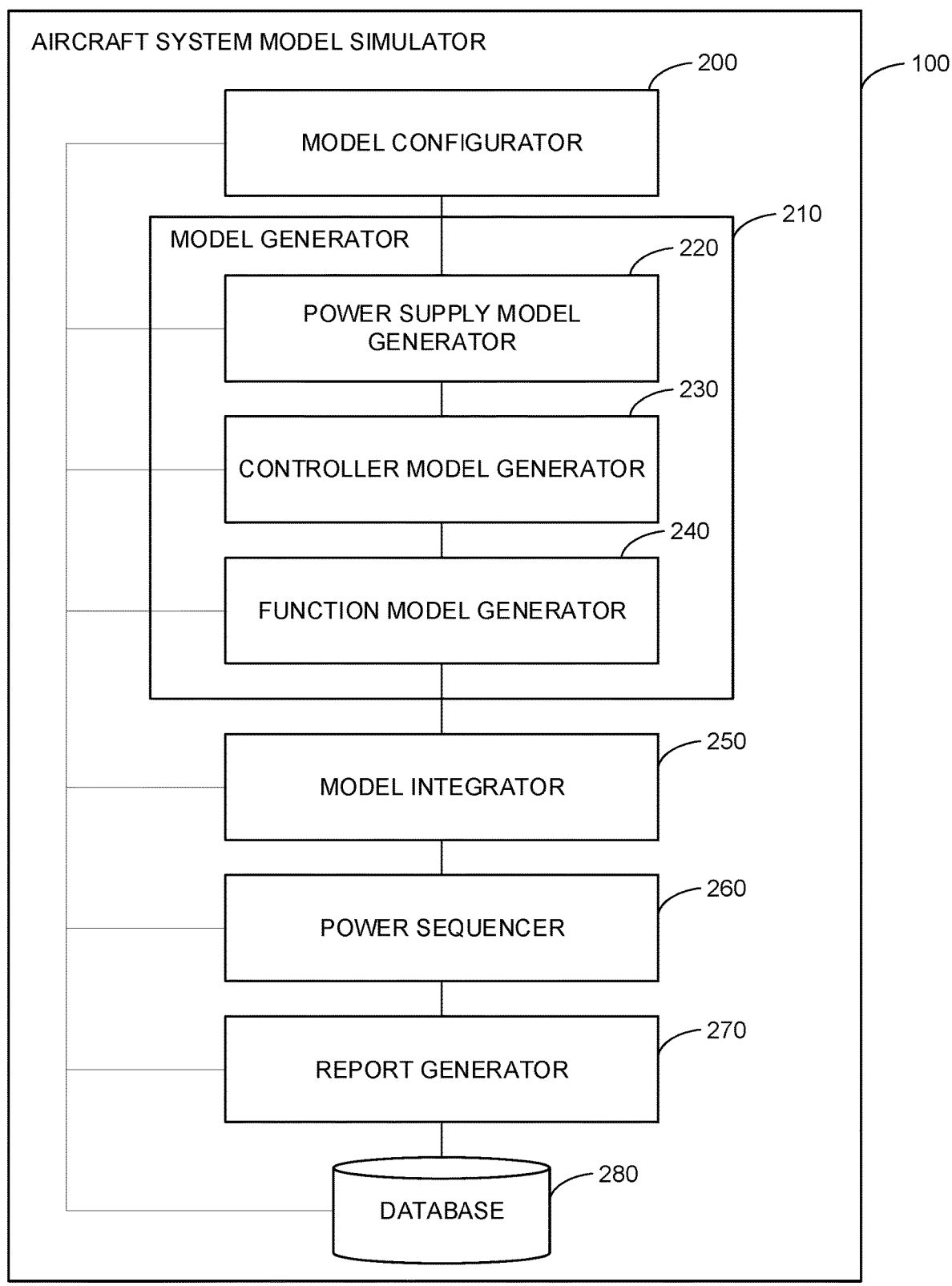
FIG. 2 is a block diagram of an example implementation of the example aircraft system model simulator of FIG. 1.

FIG. 2 is a block diagram of an example implementation of the example ASMS 100 of FIG. 1. In the illustrated example, the ASMS 100 can configure, generate, and execute a model of an aircraft system using a standardized architecture. In some examples, the ASMS configures, generates, and executes the aircraft model system using a computer-based simulation tool (e.g., MATLAB® Simulink®, National Instruments® LabVIEW™, etc.). In the illustrated example of FIG. 2, the ASMS 100 includes an example model configurator 200, an example model generator 210, an example power supply model generator 220, an example controller model generator 230, an example function model generator 240, an example model integrator 250, an example power sequencer 260, an example report generator 270, and an example database 280.

In the illustrated example of FIG. 2, the ASMS 100 includes the model configurator 200 to configure an aircraft system model of interest. For example, the model configurator 200 may select the motor 142, the motor controller 144, and/or, more generally, the first trailing-edge flap 102 of FIG. 1 to model. In some examples, the model configurator 200 generates aircraft system requirements corresponding to the aircraft system model of interest. For example, the model configurator 200 may map the first trailing-edge flap 102 to a trailing-edge type in an aircraft system model database (e.g., an extensible markup language (XML) file, an HTML file, etc.). The example model configurator 200 may determine a model parameter based on the mapping. For example, the model configurator 200 may determine that the first trailing-edge flap 102 includes the motor 142 and the motor controller 144 of FIG. 1. In such an example, the model configurator 200 may determine that the first aircraft system model 146 of FIG. 1 for the motor 142 includes the power supply model 150 and the controller model 152.

In some examples, the model configurator 200 configures a model for an aircraft system by modifying a value of a flag. As used herein, the flag is a variable in computer and/or machine readable instructions that may alert the ASMS 100 (e.g., the model generator 210, the model integrator 250, etc.) of a status of the function associated with the flag. For example, the model configurator 200 may enable a first power supply flag for the first aircraft system model 146 indicating that the first aircraft system model 146 includes the power supply model 150. Alternatively, the example model configurator 200 may disable the first power supply flag indicating that the first aircraft system model 146 does not include a power supply model.

In some examples, the model configurator 200 configures a power supply model. For example, the model configurator 200 may configure a power input signal (e.g., a voltage value, a current value, etc.), a voltage threshold check parameter, a delay on parameter, a delay off parameter, an enable signal output signal, etc., and/or a combination thereof of the power supply model 150 of FIG. 1 corresponding to a function, an operation, etc., of a power supply (e.g., a voltage source, a current source, etc.) to the motor 142 of FIG. 1.

In some examples, the model configurator 200 configures an operational state controller (e.g., an operational state controller model) included in a controller model. For example, the model configurator 200 may configure one or more states of an operational state controller of the controller model 152 of FIG. 1. For example, the model configurator 200 may configure an initialization state, a fail-safe state, a limited operation state, a normal operation state, etc., where each state may include one or more functions. In some examples, the model configurator 200 configures a set of conditions, parameters, thresholds, etc., that can be used to trigger a state or trigger a state transition. For example, the model configurator 200 may configure a set of conditions used by the operational state controller of the controller model 152 of FIG. 1 to transition from an initialization state to a limited operation state.

In some examples, the model configurator 200 configures a function model (e.g., a controller function model). For example, the model configurator 200 may configure a model of one or more functions executed by the motor controller 144 of FIG. 1 when the motor controller 144 is in an initialization state, a limited operation state, etc. For example, the model configurator 200 may configure a function such as an input data acquisition function, an input processing function, a system component function, an output processing function, an output data acquisition function, etc., of the motor controller 144 when the controller is in a specified state. For example, the model configurator 200 may configure a parameter a data acquisition rate, a communication protocol parameter, etc.) corresponding to an input data acquisition function such as acquiring sensor data using an input communication interface when the motor controller 144 is in a specified state. In another example, the model configurator 200 may configure a parameter (e.g., a processing cycle time, a function algorithm or calculation parameter, etc.) corresponding to a system component function such as calculating a pressure value based on a pressure sensor measurement using a simulator processor when the motor controller 144 is in a specified state.

In the illustrated example of FIG. 2, the ASMS 100 includes the model generator 210 to generate a model of an aircraft system based on a configuration of the model using a standardized architecture. For example, the model generator 210 may generate the first and the second aircraft system models 146, 148 of FIG. 1. In the illustrated example, the model generator 210 includes the power supply model generator 220 to generate a model of a power supply of an aircraft system using the standardized architecture. For example, the power supply model generator 220 may generate the power supply model 150 of FIG. 1 to simulate a power input (e.g., a power input characteristic), a power output (e.g., a power output characteristic), etc., of the motor 142 of FIG. 1.

In some examples, the power supply model generator 220 generates a power supply model using parameters corresponding to a power input signal and an enable signal output. In some examples, the power supply model generator 220 generates the power supply model using parameters such as voltage threshold check parameters, delay on parameters, delay off parameters, etc. For example, the power supply model generator 220 may generate the power supply model 150 of FIG. 1 using values for a low voltage threshold check parameter, a high voltage threshold check parameter, a power type, etc. For example, the power supply model generator 220 may generate the power supply model 150 of FIG. 1 using a low voltage threshold check parameter value of 80 VAC. In such an example, the power supply model generator 220 may generate the power supply model 150 of FIG. 1 in which the power supply model 150 generates an alert, an alarm, a flagged event, an indicator (e.g., a visual indicator), etc., when a simulated power input signal to the power supply model 150 is less than 80 VAC.

In the illustrated example of FIG. 2, the model generator 210 includes the controller model generator 230 to generate a model of a controller of an aircraft system using the standardized architecture. For example, the controller model generator 230 may generate the controller model 152 of FIG. 1 to simulate the motor controller 144 of FIG. 1. In some examples, the controller model generator 230 generates a controller model including one or more states of the controller. For example, the controller model generator 230 may generate the controller model 152 to include an initialization state, a fail-safe state, a limited operation state, a normal operation state, etc., and/or a combination thereof.

In some examples, the controller model generator 230 generates the controller model including one or more states to execute a set of functions, to transition to another state based on a parameter changing, a threshold being satisfied, etc. For example, the controller model generator 230 may generate the controller model 152 of FIG. 1 to include a limited operation state operative to execute a first set of functions and a normal operation state operative to execute a second set of functions where a number of functions in the first set is less than a number of functions in the second set. In another example, the controller model generator 230 may generate the controller model 152 of FIG. 1 to include parameters corresponding to a state transition. For example, the controller model generator 230 may generate the controller model 152 of FIG. 1 to include an enable operational state parameter, which when enabled, triggers a transition from an initialization state to a limited operation state.

In the illustrated example of FIG. 2, the model generator 210 includes the function model generator 240 to generate a model of one or more controller functions corresponding to a controller of an aircraft system using the standardized architecture. For example, the function model generator 240 may generate a model of one or more functions executed by the controller model 152 of FIG. 1 to simulate a function, an operation, etc., of the motor controller 144 of FIG. 1, when the motor controller 144 is in a specified state (e.g., an initialization state, a limited operation state, etc.). The function models of the example controller model 152 may simulate typical controller function such as obtaining sensor data, executing an algorithm based on the sensor data, activating an actuator based on the executed algorithm, etc., when the motor controller 144 is in a specified state For example, the function model generator 240 may generate a model including input data acquisition functions, input processing functions, system component functions, output processing functions, output data acquisition functions, etc., corresponding to one or more operations of the motor controller 144 of FIG. 1 when the motor controller 144 is in a specified state. For example, the function model generator 240 may generate a function model of an input processing function of the controller model 152 in which the function model validates an input signal obtained from a simulated sensor, a simulated input communication interface, etc., processes the input signal (e.g., converts the input signal to engineering units, scales the converted input signal, etc.), and transmits the processed input signal to a simulator processor.

In the illustrated example of FIG. 2, the ASMS 100 includes the model integrator 250 to integrate aircraft system models based on the standardized architecture. In some examples, the model integrator 250 generates the integrated aircraft system model 154 of FIG. 1 to include one or more aircraft system models such as the first and the second aircraft system models 146, 148 of FIG. 1. For example, the model integrator 250 may generate the integrated aircraft system model 154 corresponding to a plurality of, an entirety of, etc., of models of the aircraft systems of the aircraft 104 of FIG. 1 including the first and the second aircraft system models 146, 148 of FIG. 1. In some examples, the model integrator 250 can integrate the aircraft system models due to the aircraft system models being configured and generated using the standardized architecture. For example, the model integrator 250 may ensure that timing is synchronized between the first and the second aircraft system models 146, 148 based on the first and the second aircraft system models 146, 148 utilizing standard parameters for timing compliance.

In the illustrated example of FIG. 2, the ASMS 100 includes the power sequencer 260 to perform a power sequence on one or more aircraft system models, the integrated aircraft system model 154 of FIG. 1, etc. In some examples, the power sequencer 260 performs an integrated aircraft system test on the integrated aircraft system model 154 of FIG. 1, For example, the power sequencer 260 may simulate a power-up sequence of the integrated aircraft system model 154 based on the first and the second aircraft system models 146, 148 of FIG. 1. In some examples, the power sequencer 260 imports power sequences based on a standardized format to execute. For example, the power sequencer 260 may obtain a list including one or more power sequences from the database 280 to be performed in any order of execution. In such an example, the one or more power sequences include similar (e.g., substantially similar) parameters (e.g., timing parameters, lag time parameters, etc.) to help ensure interoperability between aircraft system models using the standardized architecture.

In some examples, the power sequencer 260 imports flagging criteria based on a standardized format. As used herein, the terms "alert criteria" and "flagging criteria" are used interchangeably and refer to criteria used by an aircraft system model (e.g., a power supply model, a controller model, etc.) to generate an alert, an alarm, a flagged event, an indicator (e.g., a visual indicator, etc.), etc., when satisfied. For example, an example flagging criterion may correspond to an occurrence of a discrete event (e.g., a component has an incorrect input voltage, a component is enabled, etc.), an occurrence of an unexpected event (e.g., a component is disabled when the component should be enabled, a component has a higher than anticipated input voltage, etc.).

In some examples, the power sequencer 260 obtains a list including one or more flagging criteria from the database 280. For example, the one or more flagging criteria may include similar (e.g., substantially similar) criteria (e.g., timing flag criteria, non-responsive flag criteria, etc.) to help ensure interoperability between aircraft system models using the standardized architecture. For example, the power sequencer 260 may use the flagging criteria to evaluate each model included in the first aircraft system model 146, the integrated aircraft system model 154, etc. For example, the power sequencer 260 may evaluate (1) the power supply model 150 of FIG. 1 of the first aircraft system model 146 using flagging criteria and (2) the power supply model 150 of the second aircraft system model 148 using the flagging criteria. In another example, the power sequencer 260 may evaluate (1) the power supply model 150 of the first aircraft system model 146 and (2) the controller model 152 of FIG. 1 of the second aircraft system model 148 using the flagging criteria.

In some examples, the power sequencer 260 identifies discrete events (e.g., alerts, alarms, flagged events, indicators, etc.) when executing the first aircraft system model 146, the integrated aircraft system model 154, etc., and generates a timeline (e.g., a visual timeline) based on the discrete events and corresponding timestamps. For example, the power sequencer 260 may execute a power sequence on the first aircraft system model 146 of FIG. 1 and identify (1) a first discrete event at a first timestamp based on a first flagging criterion being satisfied and (2) a second discrete event at a second timestamp based on a second flagging criterion being satisfied, where the first timestamp occurs before the second timestamp. The example power sequencer 260 may generate a timeline of the power sequence executed by the aircraft system model 146 of FIG. 1 including a depiction of the first discrete event occurring before the second discrete event.

In some examples, the power sequencer 260 generates the timeline depicting a third discrete event corresponding to a combination or a representation sum of the first and the second discrete events to reduce a visual complexity, to reduce a cluttering, etc., of the timeline. In some examples, the power sequencer 260 generates the timeline depicting the first discrete event using a first color and the second discrete event using a second color to generate an easily understandable visual timeline of discrete events to be further analyzed and evaluated for design and system validation.

In the illustrated example of FIG. 2, the ASMS 100 includes the port generator 270 to generate a report based on discrete events identified while performing an integrated aircraft system test on the integrated aircraft system model 154 of FIG. 1. For example, the report generator 270 may process discrete events by compiling the discrete events in a list, a log, a report, etc. For example, the report generator 270 may collect the plurality of generated alerts and organize them in an alert report, a test report, a validation report, etc. For example, the validation report may include information regarding individual alerts such as, for example, a timestamp, an index, a priority, a text-based description, an alert category, etc. In some examples, the validation report includes information regarding trend analysis of recurring alerts. In some examples, the report generator 270 generates a report including a timeline of a power sequence executed by an aircraft system model (e.g., the first and the second aircraft system models 146, 148 of FIG. 1, the integrated aircraft system model 154 of FIG. 1, etc.), where the timeline includes color-coded discrete events and corresponding timestamps.

In the illustrated example of FIG. 2, the ASMS 100 includes the database 280 to record data (e.g., a model configuration, a power supply model, a controller model parameter, a function model parameter, a validation report, a timeline, a discrete event, etc.). In the illustrated example, the database 280 is communicatively coupled to the model configurator 200, the model generator 210, the power supply model generator 220, the controller model generator 230, the function model generator 240, the model integrator 250, the power sequencer 260, and the report generator 270. The example database 280 can respond to queries for information related to data in the database 280. For example, the database 280 can respond to queries for additional data by providing the additional data (e.g., the one or more data points), by providing an index associated with the additional data in the database 280, etc. The example database 280 can additionally or alternatively respond to queries when there is no additional data in the database 280 by providing a null index, an end of database identifier, etc. For example, the power supply model generator 220 can query the database 280 for a power input signal parameter, a voltage threshold check parameter, etc. In response to the query, the example database 280 can transmit the data to the example power supply model generator 220.

The example database 280 can be implemented by a volatile memory (e.g., a Synchronous Dynamic Random Access Memory (SDRAM), Dynamic Random Access Memory (DRAM), RAMBUS Dynamic Random Access Memory (RDRAM), etc. and/or a non-volatile memory (e.g., flash memory). The example database 280 can additionally or alternatively be implemented by one or more double data rate (DDR) memories, such as DDR, DDR2, DDR3, DDR4, mobile DDR (mDDR), etc. The example database 280 can additionally or alternatively be implemented by one or more mass storage devices such as hard disk drive(s), compact disk drive(s) digital versatile disk drive(s), solid-state drives, etc. While in the illustrated example the database 280 is illustrated as a single database, the database 280 can be implemented by any number and/or type(s) of databases.

While an example manner of implementing the ASMS 100 of FIG. 1 is illustrated in FIG. 2, one or more of the elements, processes and/or devices illustrated in FIG. 2 may be combined, divided, re-arranged, omitted, eliminated, and/or implemented in any other way. Further, the example model configurator 200, the example model generator 210, the example power supply model generator 220, the example controller model generator 230, the example function model generator 240, the example model integrator 250, the example power sequencer 260, the example report generator 270, the example database 280, and/or, more generally, the example ASMS 100 of FIG. 1 may be implemented by hardware, software, firmware and/or any combination of hardware, software and/or firmware. Thus, for example, any of the example model configurator 200, the example model generator 210, the example power supply model generator 220, the example controller model generator 230, the example function model generator 240, the example model integrator 250, the example power sequencer 260, the example report generator 270, the example database 280 and/or, more generally, the example ASMS 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model configurator 200, the example model generator 210, the example power supply model generator 220, the example controller model generator 230, the example function model generator 240, the example model integrator 250, the example power sequencer 260, the example report generator 270, and/or the example database 280 is/are hereby expressly defined to include a non-transitory computer readable storage device or storage disk such as a memory, a digital versatile disk (DVD), a compact disk (CD), a Blu-ray disk, etc. including the software and/or firmware. Further still, the example ASMS 100 of FIG. 1 may include one or more elements, processes and/or devices in addition to, or instead of, those illustrated in FIG. 2, and/or may include more than one of any or all of the illustrated elements, processes, and devices.

Figure 3:
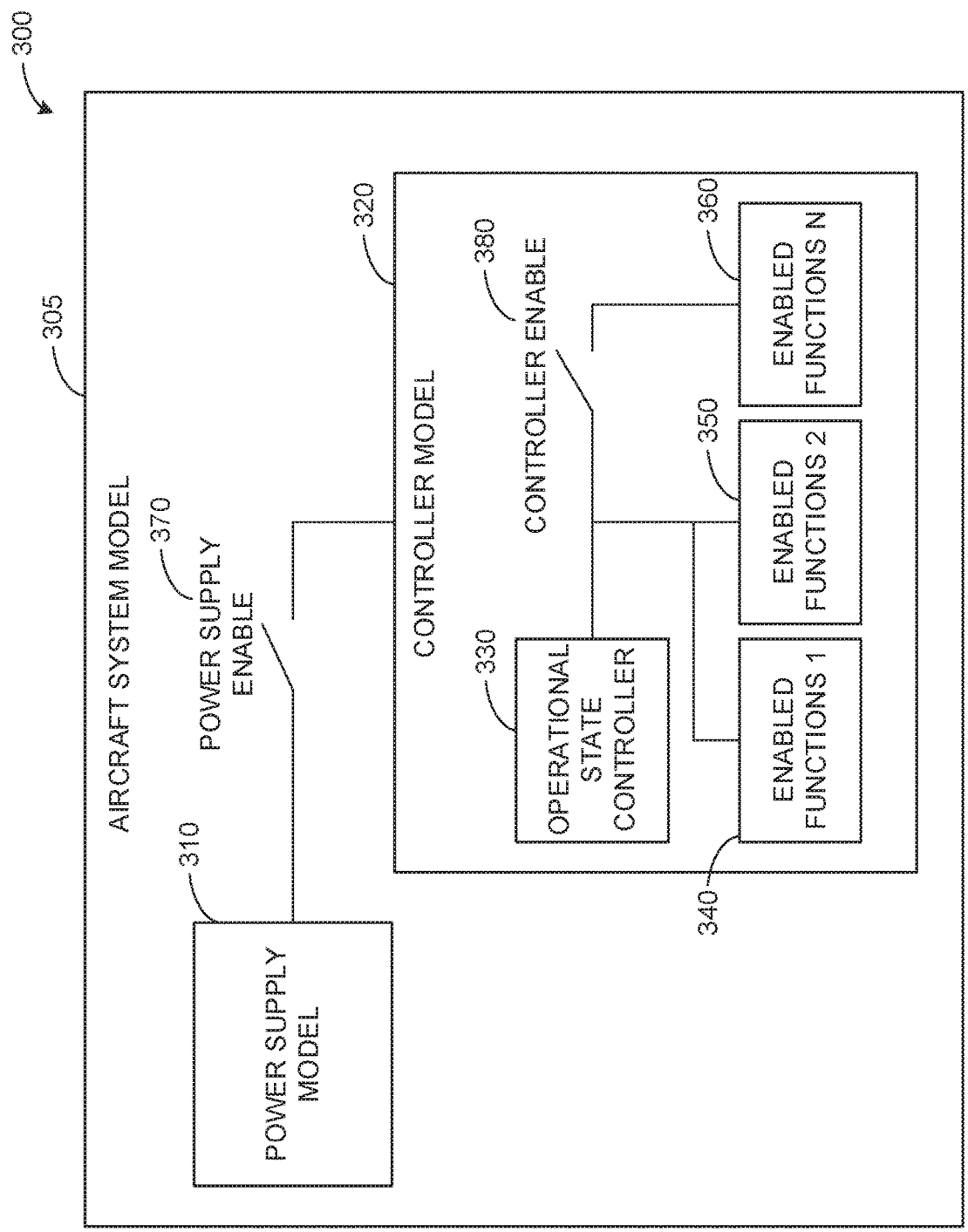
FIG. 3 is a block diagram of an example implementation of an example model of an example aircraft system simulated by the example aircraft system model simulator of FIGS. 1-2.

FIG. 3 is a block diagram of an example implementation of an example aircraft system model 300 of an example aircraft system simulated by the example ASMS 100 of FIGS. 1-2 using a standardized architecture 305. For example, the aircraft system model 300 may correspond to the first aircraft system model 146 of FIG. 1. For example, the aircraft system model 300 may correspond to a model capable of simulating the motor 142 of FIG. 1. In the illustrated example, the aircraft system model 300 includes a power supply model 310 and a controller model 320 to simulate an operation of the aircraft system using the standardized architecture 305. For example, the power supply model 310 may correspond to the power supply model 150 of FIG. 1 to simulate a power parameter, a control operation, etc., of the motor 142 of FIG. 1. In another example, the controller model 320 may correspond to the controller model 152 of FIG. 1 to simulate a power parameter, a control operation, etc., of the motor controller 144 of FIG. 1. Additionally or alternatively, the example aircraft system model 300 may include fewer or more components than depicted in the aircraft system model 300 of FIG. 3.

In the illustrated example of FIG. 3, the aircraft system model 300 includes the power supply model 310 to simulate a power supply of the aircraft system based on a configuration of one or more power supply parameters a power input signal parameter, a delay on parameter, etc.). For example, the power supply model 310 may simulate a power supply to the motor 142, the motor controller 144, etc., of FIG. 1. For example, the power supply model 310 may simulate a power input of 24 VDC to the motor controller 144. Alternatively, the example power supply model 310 may simulate a mechanical power source (e.g., a hydraulic motor), an electro-mechanical power source (e.g., a hydraulic motor controlled by an electrical-based component such as a controller, a solenoid, etc.), etc., to an aircraft system.

In the illustrated example of FIG. 3, the aircraft system model 300 includes the controller model 320 to simulate a control operation of the aircraft system based on a configuration of one or more states of an operational state controller 330. For example, the controller model 320 may simulate the motor 142, the motor controller 144, etc., of FIG. 1 executing one or more functions, operations, etc., while in a specified state. For example, the controller model 320 may use the operational state controller 330 to simulate the motor controller 144 operating in an initialization state, a fail-safe state, a limited operation state, a normal operation state, etc. For example, the controller model 320 may simulate the motor controller 144 by configuring a condition, which when satisfied, triggers the controller model 320 to operate in an initialization state. For example, the controller model 320 may execute a set of functions (e.g., function operations, function tasks, etc.) corresponding to the set of functions executed by the controller in an initialization state.

In some examples, the controller model 320 simulates a controller of the aircraft system based on a configuration of enabled functions 1 340, enabled functions 2 350, and enabled functions N 360. In the illustrated example, the enabled functions N 360 represents an Nth number of enabled functions. In the illustrated example, the enabled functions 1-3 340, 350, 360 are controller function models (e.g., a model including a set of controller functions, a set of controller function models, etc.). For example, an aircraft system model using the standardized architecture 305 may include no enabled functions or an Nth set of enabled functions. In the illustrated example, the enabled functions 1-3 340, 350, 360 are function models that simulate functions executed by the controller of the aircraft system when operating in a specified state. For example, the controller model 320 may execute enabled functions 1 340 when the operational state controller 330 is in a limited operation state. In another example, the controller model 320 may execute enabled functions 1 340 when the operational state controller 330 is in an initialization state and may execute enabled functions 1 340 and enabled functions 2 350 when the operational state controller 330 is in a limited operation state.

In the illustrated example of FIG. 3, the aircraft system model 300 simulates the controller model 320 executing one or more of the enabled functions 1-N 340, 350, 360 via a controller enable switch 380. For example, the aircraft system model 300 may simulate the motor controller 144 of FIG. 1 executing an operation based on a state of the motor controller 144. For example, the controller model 320 may enable the controller enable switch 380 to execute a set of functions included in the enabled functions N 360 when the operational state controller 330 is in a specified state. For example, the controller model 320 controlling an operation of the controller enable switch 380 may correspond to a pilot, a control system, etc., controlling an operation of the first trailing-edge flap 102 when the first trailing-edge flap 102 is in an initialization state, a limited operation state, etc.

Figure 4:
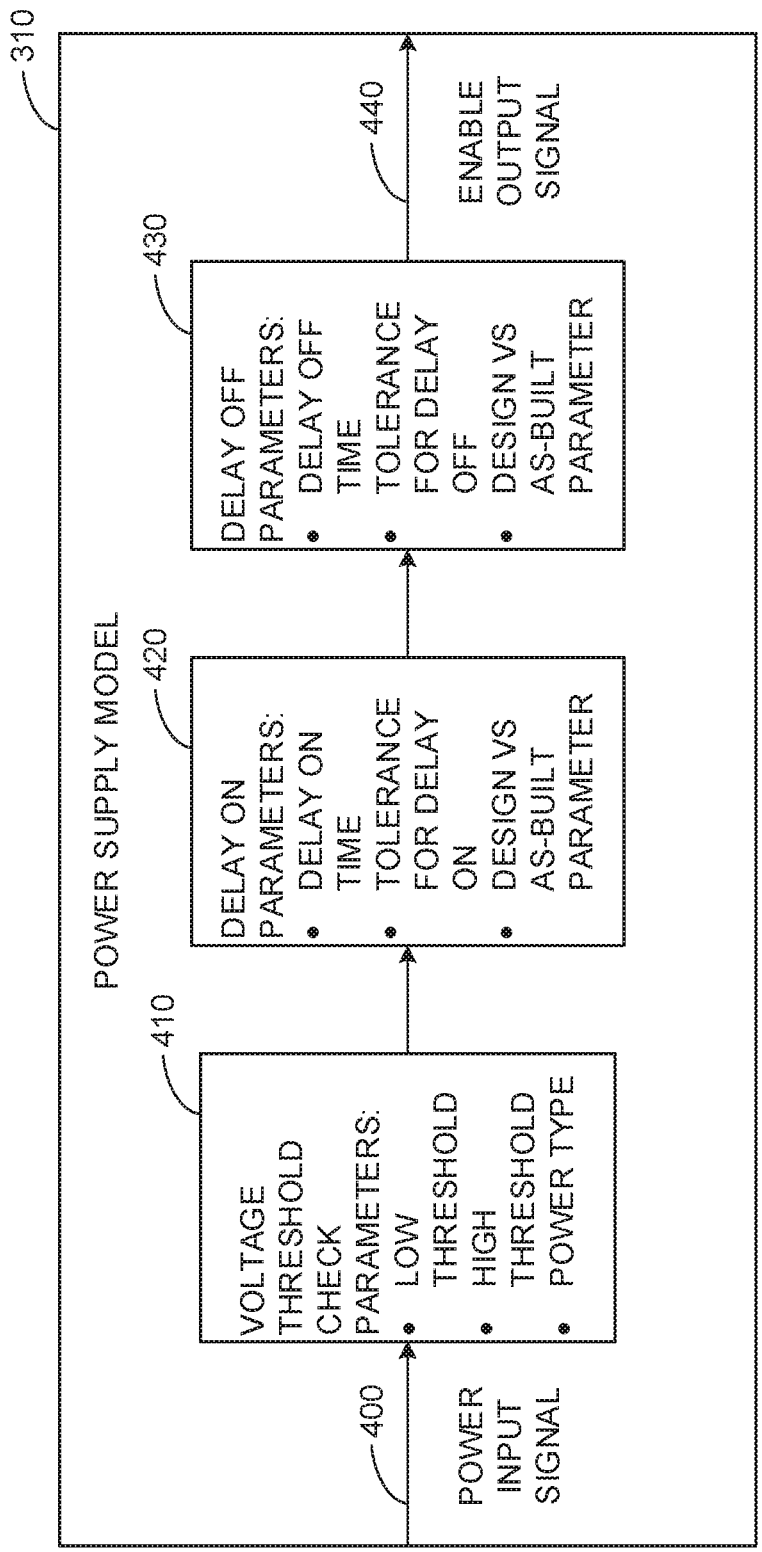
FIG. 4 is a block diagram of an example implementation of an example power supply model simulated by the example aircraft system model simulator of FIGS. 1-2.

FIG. 4 is a block diagram of an example implementation of the example power supply model 310 of FIG. 3 simulated by the ASMS 100 of FIGS. 1-2. In the illustrated example, the power supply model 310 is simulated by a power input signal 400, voltage threshold check parameters 410, delay on parameters 420, delay off parameters 430, and an enable output signal 440. Additionally or alternatively, the example power supply model 310 may include fewer or more configurable signals or parameters than depicted in the power supply model 310 of FIG. 4.

In the illustrated example, the power supply model 310 simulates a power supply of an aircraft system (e.g., the motor 142 of FIG. 1, the motor controller 144 of FIG. 1, etc.) by configuring one or more parameters corresponding to the power input signal 400. For example, the power supply model 310 may configure a parameter such as a voltage, a frequency, a type of power (e.g., AC power, DC power, etc.), etc., corresponding to the power input signal 400. In the illustrated example, the power supply model 310 validates a design, an operation, etc., of the aircraft system by comparing (e.g., iteratively comparing) the power input signal 400 to one or more of the voltage threshold check parameters 420.

For example, the power supply model 310 may compare (1) the power input signal 400 simulated using a power input signal of 80 VAC to (2) a low threshold of 100 VAC, a high threshold of 300 VAC, and a power type parameter of AC power. The example power supply model 310 may generate a discrete event indicating that the simulated power input signal of 80 VAC satisfies the low threshold of 100 VAC based on the simulated power input signal being less than the low threshold. The example power supply model 310 may not generate a discrete event indicating that the simulated power input signal of 80 VAC does not satisfy the high threshold of 300 VAC based on the simulated power input signal being less than the high threshold. The example power supply model 310 may not generate a discrete event indicating that a power type of the simulated power input signal of 80 VAC matches the power type parameter of AC power.

In the illustrated example, the power supply model 310 simulates the power supply of the aircraft system (e.g., the motor 142 of FIG. 1, the motor controller 144 of FIG. 1, etc.) by configuring one or more of the delay on parameters 420 corresponding to the power input signal 400. For example, the power supply model 310 may configure a parameter included in the delay on parameters 420 such as a delay on time parameter, a tolerance for delay on parameter, and a design vs. as-built parameter. In the illustrated example, the power supply model 310 validates a design, an operation, etc., of the aircraft system by comparing (e.g., iteratively comparing) the power input signal 400 to one or more of the delay on parameters 420.

For example, the power supply model 310 may compare (1) the power input signal 400 simulated using a power input signal having a delay on time of 225 milliseconds to (2) a delay on time parameter of 200 milliseconds, a tolerance for delay on parameter of 50 milliseconds, and/or a design vs. as-built parameter of 200 milliseconds. In some examples, the design vs. as-built parameter is a design validation parameter. For example, the delay off time design validation parameter may correspond to a configuration of the power supply model 310 to use either a design value of a parameter or an as-built value of the parameter to validate an aircraft system design. For example, the design vs. as-built parameter may be a value that can be toggled between a design value of the delay on time parameter of 250 milliseconds or an as-built value of the delay on time parameter of 200 milliseconds to determine an impact of the as-built value compared to the design value on the power supply model 310. In the above-example, the as-built parameter value of 200 milliseconds may correspond to the power supply model 310 being configured to use the as-built value of 200 milliseconds for the delay on time parameter to determine an operating behavior of the power supply model 310 using the as-built value.

The example power supply model 310 may generate a discrete event indicating that the simulated delay on time of 225 milliseconds is greater than the delay on time parameter of 200 milliseconds. The example power supply model 310 may not generate a discrete event indicating that the simulated delay on time of 225 milliseconds is within the tolerance of 50 milliseconds of the delay on time parameter of 200 milliseconds.

In the illustrated example, the power supply model 310 simulates the power supply of the aircraft system (e.g., the motor 142 of FIG. 1, the motor controller 144 of FIG. 1, etc.) by configuring one or more of the delay off parameters 430 corresponding to the power input signal 400. For example, the power supply model 310 may configure a parameter included in the delay off parameters 430 such as a delay off time parameter, a tolerance for delay off parameter, and a design vs. as-built parameter. In the illustrated example, the power supply model 310 validates a design, an operation, etc., of the aircraft system by comparing (e.g., iteratively comparing) the power input signal 400 to one or more of the delay off parameters 430.

For example, the power supply model 310 may compare (1) the power input signal 400 simulated using a power input signal having a delay off time of 175 milliseconds to (2) a delay off time parameter of 150 milliseconds, a tolerance for delay off parameter of 50 milliseconds, and/or a design vs. as-built parameter of 150 milliseconds. In such an example, the delay off time design vs. as-built parameter (e.g., the delay off time design validation parameter) of 150 milliseconds may correspond to the power supply model 310 being configured to use a design value of 150 milliseconds for the delay off time parameter to determine an operating behavior of the power supply model 310 using the design value. The example power supply model 310 may generate a discrete event indicating that the simulated delay off time of 175 milliseconds is greater than the delay off time parameter of 150 milliseconds. The example power supply model 310 may generate a discrete event indicating that the simulated delay off time of 175 milliseconds is within the tolerance of 50 milliseconds of the delay off time parameter of 150 milliseconds.

In the illustrated example, the power supply model 310 simulates the power supply of the aircraft system (e.g., the motor 142 of FIG. 1, the motor controller 144 of FIG. 1, etc.) by measuring an enable output signal from the motor 142. For example, the power supply model 310 may measure a voltage, a frequency, a type of power (e.g., AC power, DC power, etc.), etc., corresponding to the enable output signal 440. In the illustrated example, the power supply model 310 validates a design, an operation, etc., of the aircraft system by comparing (e.g., iteratively comparing) the enable output signal 440 to an anticipated enable output signal defined in a power sequence.

Figure 5:
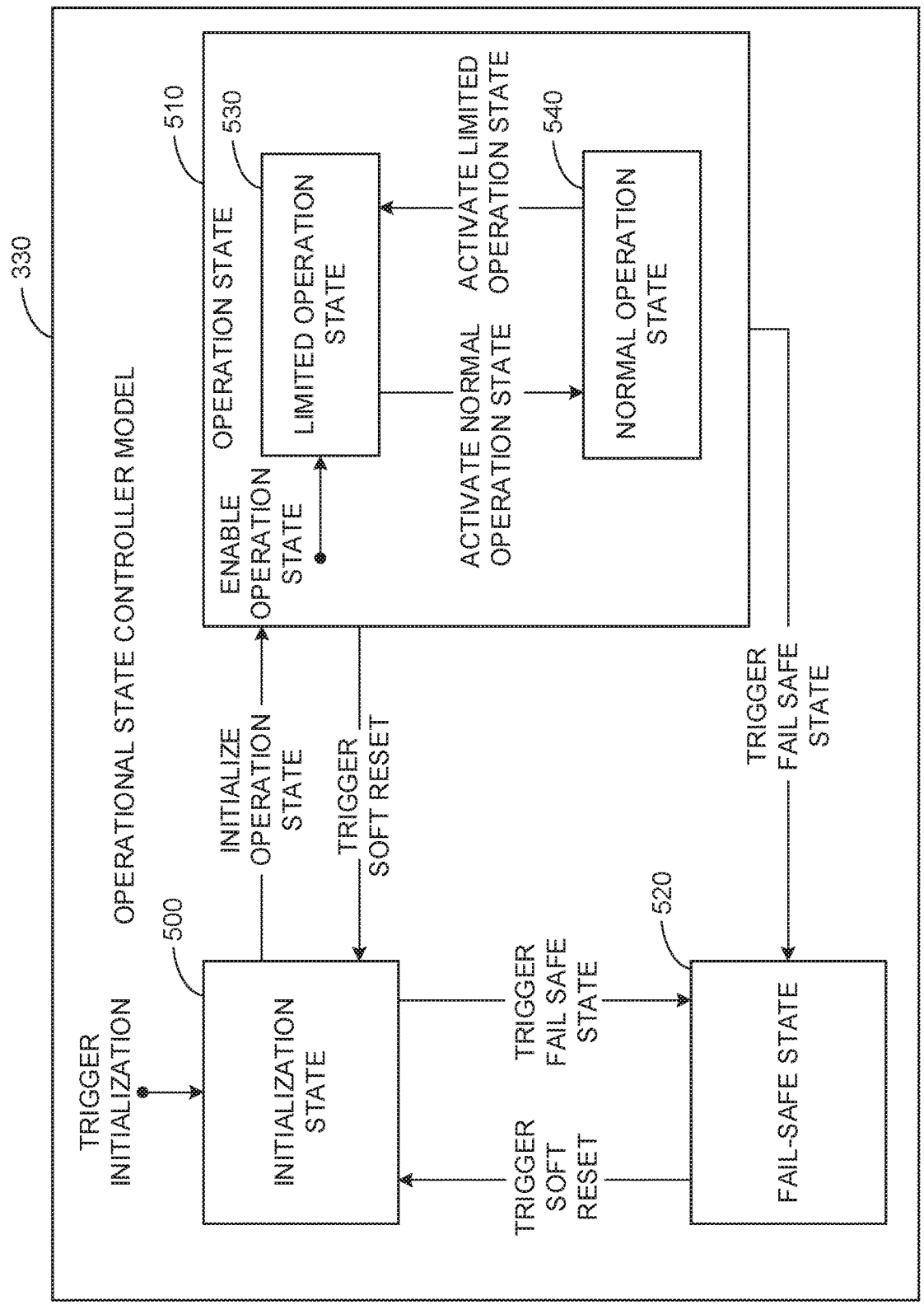
FIG. 5 is a block diagram of an example implementation of an example operational state controller simulated by the example aircraft system model simulator of FIGS. 1-2.

FIG. 5 is a block diagram of an example implementation of the example operational state controller 330 of FIG. 3 simulated by the ASMS 100 of FIGS. 1-2. In the illustrated example, the operational state controller 330 is simulated by an initialization state 500, an operation state 510, and a fail-safe state 520. The operation state 510 of the illustrated example includes a limited operation state 530 and a normal operation state 540. Additionally or alternatively, the example operational state controller 330 may include fewer or more configurable states than depicted in the operational state controller 330 of FIG. 5.

In the illustrated example of FIG. 5, the operational state controller 330 can operate in the initialization state 500. In some examples, the operational state controller 330 operates in the initialization state 500 when the aircraft system model 300 is powering up, powering down, etc. For example, the controller model 320 may execute the enabled functions 1 340 of FIG. 3 when the operational state controller 330 is in the initialization state 500. In some examples, the operational state controller 330 enters the initialization state when triggered. For example, in response to the controller model 320 powering up, the aircraft system model 300 triggers the operational state controller 330 to enter the initialization state 500.

In the illustrated example of FIG. 5, the operational state controller 330 transitions between states when a condition is satisfied. In the illustrated example, the operational state controller 330 can transition from the initialization state 500 to the operation state 510 or the fail-safe state 520. For example, the operational state controller 330 may simulate a transition of the motor 142, the motor controller 144, etc., of FIG. 1 from an initialization state to an operation state or a fail-safe state. For example, in response to the controller model 320 validating or successfully executing the enabled functions 1 340 while in the initialization state 500, the operational state controller 330 may transition to the operation state 510. In another example, in response to the controller model 320 not validating or not successfully executing the enabled functions 1 340 while in the initialization state 500, the operational state controller 330 may transition to the fail-safe state 520.

In the illustrated example of FIG. 5, the operational state controller 330 can transition from the limited operation state 530 to the normal operation state 540. For example, the operational state controller 330 may simulate a transition of the motor 142, the motor controller 144, etc., of FIG. 1 from a limited operation state to a normal operation state. For example, the limited operation state 530 may correspond to a simulation of a maintenance mode, a service mode, a test mode, etc., of the motor controller 144, and/or, more generally, the first trailing-edge flap 102 of FIG. 1. In another example, the normal operation state 540 may correspond to a simulation of an active operation mode of the motor controller 144, and/or, more generally, the first trailing-edge flap 102 of FIG. 1. For example, the controller model 320 may execute the enabled functions 1-2 340, 350 of FIG. 3 while in the limited operation state 530 to simulate a maintenance mode of the first trailing-edge flap 102. In response to the controller model 320 validating or successfully executing the enabled functions 1-2 340, 350 while in the limited operation state 530, the operational state controller 330 may transition to the normal operation state 540. In the illustrated example, the operational state controller 330 can transition from the normal operation state 540 to the limited operation state 530.

In the illustrated example of FIG. 5, the operational state controller 330 can transition from the operation state 510 (e.g., the limited operation state 530, the normal operation state 540, etc.) to the fail-safe state 520, For example, the operational state controller 330 may simulate a transition of the motor 142, the motor controller 144, etc., of FIG. 1 from an operation state to a fail-safe state. For example, the operational state controller 330 may transition from the operation state 510 to the fail-safe state 520 when a discrete event is detected (e.g., a non-responsive condition is detected for one or more components of an aircraft system). For example, the operational state controller 330 may transition from the normal operation state 540 to the fail-safe state 520 when the power supply model 310 determines that the power input signal 400 of FIG. 4 satisfies one or more of the voltage threshold check parameters 410 (e.g., the power input signal 400 satisfies a low threshold, a high threshold, etc.). In some examples, in response to correcting, mitigating, or resolving the non-responsive condition, the operational state controller 330 can transition from the fail-safe state 520 to the initialization state 500 by triggering a soft reset (e.g., a soft reboot, a power cycle, etc.).

Figure 6:
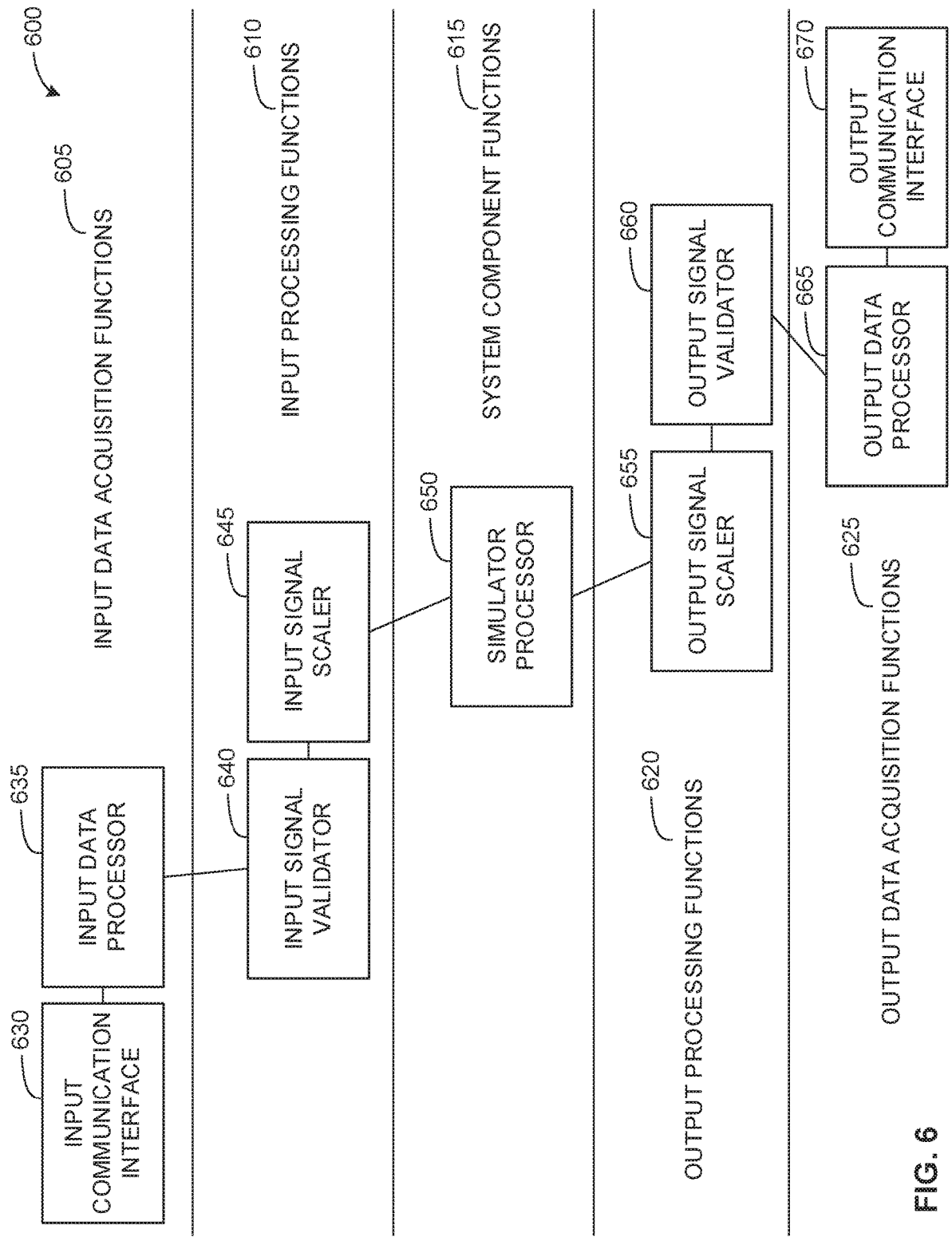
FIG. 6 is a block diagram of an example implementation of an example function model simulated by the example aircraft system model simulator of FIGS. 1-2.

FIG. 6 is a block diagram of an example implementation of a function model 600 simulated by the example ASMS 100 of FIGS. 1-2. The functions model 600 of the illustrated example may correspond to the enabled functions 1-3 340, 350, 360 of FIG. 3. For example, the functions model 600 may correspond to controller functions of the motor controller 144 of FIG. 1 when the motor controller 144 is in a specified state. In the illustrated example, the function model 600 includes example input data acquisition functions 605, example input processing functions 610, example system component functions 615, example output processing functions 620, and example output data acquisition functions 625. Additionally or alternatively, the example function model 600 may include any other type of enabled functions.

In the illustrated example of FIG. 6, the function model 600 includes the input data acquisition functions 605 to simulate obtaining sensor data or sensor data included in data packets via a communication protocol. In the illustrated example, the input data acquisition functions 605 include an example input communication interface 630 and an example input data processor 635.

The input communication interface 630 of the illustrated example simulates obtaining sensor data. For example, the input communication interface 630 may obtain sensor data from a sensor (e.g., a pressure sensor, a temperature sensor, a speed sensor, etc.). In another example, the input communication interface 630 may obtain a data packet via a communication protocol (e.g., a bus protocol such as controller area network (CAN) bus, Modbus, Profibus, etc.), an Ethernet-based protocol (e.g., EtherCAT, Profinet, etc.), a serial protocol (e.g., RS-232, RS-485, etc.). The data packet may include the sensor data in a data payload of the data packet.

The input data processor 635 of the illustrated example simulates processing the sensor data obtained from the input communication interface 630. For example, the input data processor 635 may convert an analog signal obtained from a sensor to a digital signal via an analog-to-digital converter. In another example, the input data processor 635 may extract sensor data from a communication protocol data packet.

In the illustrated example of FIG. 6, the function model 600 includes the input processing functions 610 to simulate validating and scaling input sensor data. In the illustrated example, the input processing functions 610 include an example input signal validator 640 and an example input signal scaler 645. The input signal validator 640 of the illustrated example compares a sensor measurement for a parameter to a pre-defined range of acceptable sensor measurements for the parameter. For example, the input signal validator 640 may compare an analog input value of 12 milliamps (mA) for a pressure sensor measurement to a pre-defined range of the analog input value of 0-20 mA for the pressure sensor measurement. In such an example, the input signal validator 640 may validate the analog input value of 12 mA based on the comparison.

The input signal scaler 645 of the illustrated example simulated scaling input sensor data. For example, in response to the input signal validator 640 validating an analog input value for the pressure sensor measurement, the input signal scaler 645 may scale the analog input value to a pressure sensor measurement value. For example, the input signal scaler 645 may scale an analog input value of 2.5 Volts obtained from a pressure sensor to a pressure sensor measurement value of 100 pounds per square inch (PSI) based on a pre-defined pressure sensor measurement range. For example, the input signal scaler 645 may scale the analog input value using a pre-defined pressure sensor measurement range of 1-5 Volts corresponding to a pressure sensor measurement range of 0-200 PSI.

In the illustrated example of FIG. 6, the function model 600 includes the system component functions 615 to simulate processing sensor data. The system component functions 615 of the illustrated example includes a simulator processor 650 to execute an algorithm, perform a calculation, etc., using the sensor data obtained by the input data acquisition functions 605 and processed by the input processing functions 610. For example, the simulator processor 650 may correspond to a simulation of a processor of the motor controller 144 of FIG. 1 to perform an aircraft system function such as calculating a pressure sensor value based on sensor data obtained from a sensor monitoring the motor 142, commanding the motor 142 to operate at a specified rate, etc.

In the illustrated example of FIG. 6, the function model 600 includes the output processing functions 620 to simulate scaling and validating output data calculated by the simulator processor 650. In the illustrated example, the output processing functions 620 include an example output signal scaler 655 and an example output signal validator 660. The output signal scaler 655 of the illustrated example scales output data. For example, the simulator processor 650 may calculate a target position of a linear actuator of 80%. In response to the simulator processor 650 calculating the target position, the output signal scaler 655 may scale the target position to an analog value. For example, the output signal scaler 655 may scale the target position of 80% to 16.8 mA based on a pre-defined target position analog output range of 4-20 mA.

In the illustrated example of FIG. 6, the output processing functions 620 include the output signal validator 660 to simulate validating output data. The input signal validator 640 of the illustrated example compares an output value for a parameter to a pre-defined range of acceptable output values for the parameter. For example, the output signal validator 660 may compare a target position analog output value of 16.8 mA to a pre-defined range of the target position analog output value of 4-20 mA. In such an example, the output signal validator 660 may validate the target position analog output value of 16.8 mA based on the comparison.

In the illustrated example of FIG. 6, the function to simulate transmitting output data to an aircraft system component (e.g., a motor, a solenoid, etc., of the first trailing-edge flap 102) or output data to another controller or computing device using a communication protocol. In the illustrated example, the output data acquisition functions 625 include an example output data processor 665 and an example output communication interface 670.

The output data processor 665 of the illustrated example simulates processing the output data obtained from the output signal validator 660. For example, the output data processor 665 may convert a digital representation (e.g., a digital value, a binary value, a hex value, etc.) of the target position to an analog output signal via, a digital-to-analog converter. In another example, the output data processor 665 may package the digital representation of the output data into a communication protocol packet (e.g., an Ethernet-based communication protocol data packet, a serial-based communication protocol data packet, etc.).

The output communication interface 670 of the illustrated example transmits sensor data. For example, the output communication interface 670 may transmit output data from the output data processor 665 to an aircraft system component (e.g., a motor, a relay, a solenoid, etc., of the first trailing-edge flap 102) or transmit output data to another controller or computing device using a communication protocol.

Flowcharts representative of example methods for implementing the ASMS 100 of FIGS. 1-2 are shown in FIGS. 7-10. In these examples, the methods may be implemented using machine readable instructions to comprise a program for execution by a processor such as a computer processor 1112 shown in the example processor platform 1100 discussed below in connection with FIG. 11. The program may be bodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 7-10, many other methods of implementing the example ASMS 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7-10 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

Figure 7:
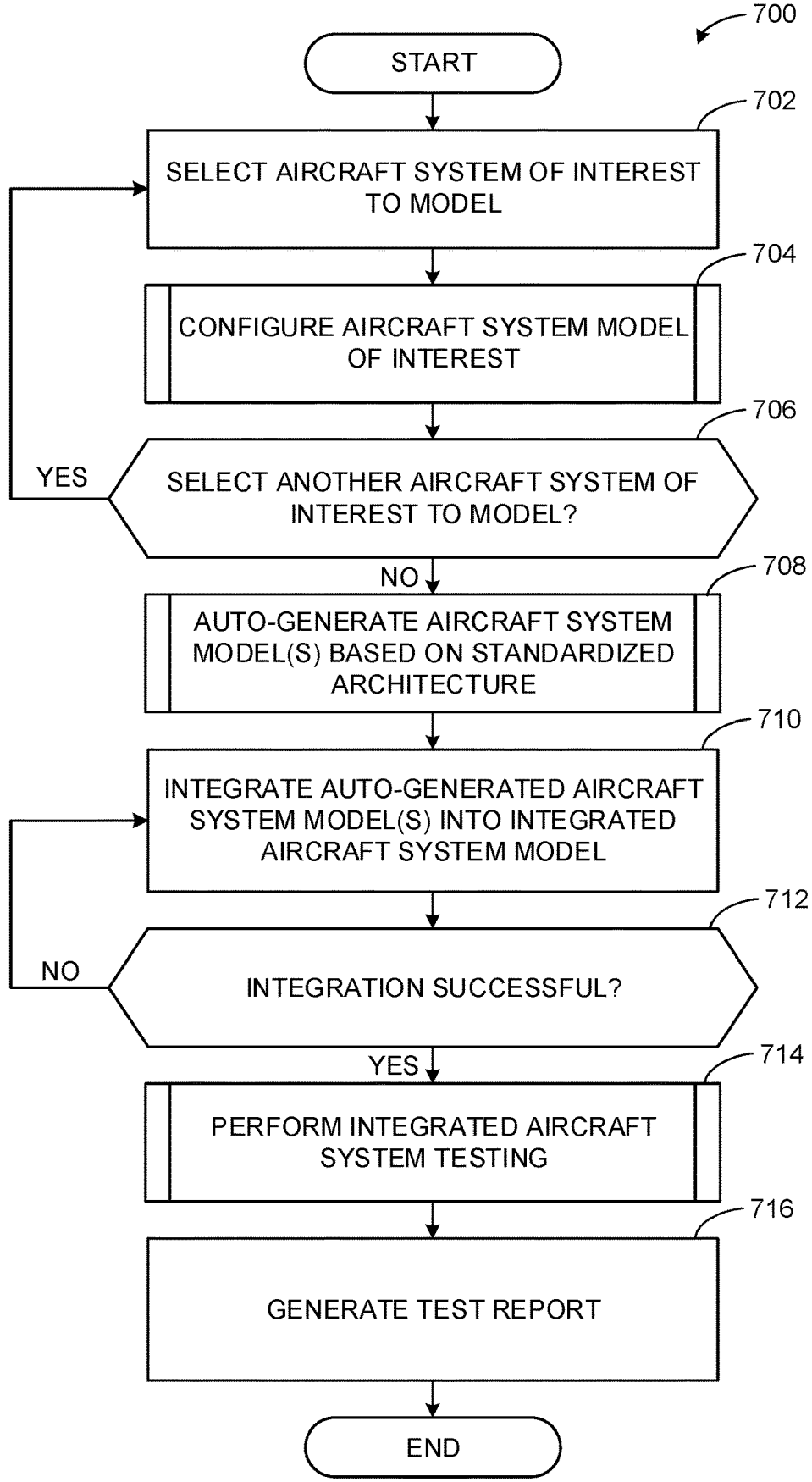

FIG. 7 is a flowchart representative of an example method 700 that may be performed by the ASMS 100 of FIGS. 1-2 to configure, generate, and test the integrated aircraft system model 154 of FIG. 1 corresponding to the aircraft 104 of FIG. 1. The example method 700 begins at block 702 when the example ASMS 100 selects an aircraft system of interest to model. For example, the model configurator 200 of FIG. 2 may select the motor 142 of FIG. 1 to model.

At block 704, the example ASMS 100 configures an aircraft system model of interest. For example, the model configurator 200 may configure the aircraft system model 300 of FIG. 3 corresponding to the motor 142. An example process that can be used to implement block 704 is described below in connection with FIG. 8. At block 706, the example ASMS 100 determines whether to select another aircraft system of interest to model. For example, the model configurator 200 may determine to model the motor controller 144 of FIG. 1, a motor included in the first elevator 126 of FIG. 1, a controller included in the second elevator 128 of FIG. 1, etc.

If, at block 706, the example ASMS 100 determines to select another aircraft system of interest to model, control returns to block 702 to select another aircraft system of interest to model. If, at block 706, the example ASMS 100 determines not to select another aircraft system of interest to model, then, at block 708, the ASMS 100 auto-generates aircraft system model(s) based on a standardized architecture. For example, the model generator 210 may generate the aircraft system model 300 of FIG. 3 using the standardized architecture 305 of FIG. 3. An example process that can be used to implement block 708 is described below in connection with FIG. 9.

At block 710, the example ASMS 100 integrates auto-generated aircraft system model(s) into an integrated aircraft system model. For example, the model integrator 250 of FIG. 2 may integrate the aircraft system model 300 into the integrated aircraft system model 154 of FIG. 1 corresponding to the aircraft 104 of FIG. 1.

At block 712, the example ASMS 100 determines whether the integration was successful. For example, the model integrator 250 may determine that the aircraft system models include configurable parameters that are compatible with the other aircraft system models. For example, the model integrator 250 may determine that the aircraft system model 300 does not include empty fields for configurable attributes, configurable parameters, etc., of the power supply model 310, the controller model 320, etc., of FIG. 3.

If, at block 712, the example ASMS 100 determines that the integration was not successful, control returns to block 710 to integrate the auto-generated aircraft system models into the integrated aircraft system model. For example, the model integrator 250 may replace an empty field with a default value and generate an alert (e.g., an integration alert), a report (e.g., an integration report), etc., indicating the replacement.

If, at block 712, the example ASMS 100 determines that the integration was successful, then, at block 714, the ASMS 100 performs integrated aircraft system testing. For example, the power sequencer 260 of FIG. 2 may simulate a power-up sequence of the integrated aircraft system model 154 of FIG. 1 by executing the first and the second aircraft system models 146, 148 based on the aircraft system model 300 of FIG. 3 using one or more power sequences. At block 716, the example ASMS 100 generates a test report. For example, the report generator 270 of FIG. 2 may generate a validation report, a test log, etc., including results from the integrated aircraft system test. In response to generating the report, the example method 700 concludes.

FIG. 8 is a flowchart representative of an example method 800 that may be performed by the ASMS 100 of FIGS. 1-2 to configure an aircraft system model of interest corresponding to the aircraft 104 of FIG. 1. The example process of FIG. 8 can be used to implement the operation of block 704 of FIG. 7. The example method 800 begins at block 802 when the example ASMS 100 generates aircraft system requirements. For example, the model configurator 200 of FIG. 2 may map the motor 142 of FIG. 1 to a motor type in the database 280 of FIG. 2 to obtain model requirements.

At block 804, the example ASMS 100 determines whether the aircraft system of interest includes a first power supply model. For example, the model configurator 200 may determine that the first aircraft system model 146 corresponding to the motor 142 includes the power supply model 150 of FIG. 1 based on the aircraft system requirements.

If, at block 804, the example ASMS 100 determines that the aircraft system does not include the first power supply model, control proceeds to block 808 to disable a first power supply flag. For example, the model configurator 200 may disable the first power supply flag for the aircraft system model 146 of FIG. 1. In response to disabling the first power supply flag, the example ASMS 100 disables a second power supply flag at block 810. For example, the model configurator 200 may disable the second power supply flag because if there is not a first power supply model then there is not a second power supply model.

If, at block 804, the example ASMS 100 determines that the aircraft system includes the first power supply model, then, at block 806, the ASMS 100 enables a first power supply flag and configures the first power supply model. For example, the model configurator 200 may enable the first power supply flag corresponding to the power supply model 150 of FIG. 1 and configure the power supply model 150 by configuring parameters of the power supply model 150 such as the power input signal 400, the voltage threshold check parameters 410, etc., of FIG. 4.

At block 812, the example ASMS 100 determines whether the aircraft system includes a second power supply model. For example, the model configurator 200 may determine that the motor 142 does not include a second power supply model based on the aircraft system requirements.

If, at block 812, the example ASMS 100 determines that the aircraft system does not include the second power supply model, control proceeds to block 810 to disable the second power supply flag. If, at block 812, the example ASMS 100 determines that the aircraft system includes the second power supply model, then, at block 814, the ASMS 100 enables a second power supply flag and configures the second power supply model. For example, the model configurator 200 may enable the second power supply flag corresponding to a second power supply model and configure the second power supply model based on the power supply model 310 of FIGS. 3-4 by configuring parameters of the power supply model 310 such as the power input signal 400, the voltage threshold check parameters 410, etc., of FIG. 4.

At block 816, the example ASMS 100 determines whether the aircraft system includes a first controller model. For example, the model configurator 200 may determine that the first aircraft system model 146 corresponding to the motor 142 of FIG. 1 includes the controller model 152 of FIG. 1 based on the aircraft system requirements.

If, at block 816, the example ASMS 100 determines that the aircraft system does not include the first controller model, control proceeds to block 820 to disable a first controller flag. For example, the model configurator 200 may disable the first controller flag for the aircraft system model 146 of FIG. 1. In response to disabling the first controller flag, the example ASMS 100 disables a second controller flag at block 822. For example, the model configurator 200 may disable the second controller flag because if there is not a first controller model then there is not a second controller model.

If, at block 816, the example ASMS 100 determines that the aircraft system includes the first controller model, then, at block 818, the ASMS 100 enables a first controller flag and configures the first controller model. For example, the model configurator 200 may enable the first controller flag corresponding to the controller model 152 of FIG. 1 and configure the controller model 152 by configuring the initialization state 500, the limited operation state 530, the normal operation state 540, etc., of FIG. 5 of the operational state controller 330 of FIGS. 3 and 5.

At block 824, the example ASMS 100 determines whether the aircraft system includes a second controller model. For example, the model configurator 200 may determine that the motor 142 of FIG. 1 does not include a second controller model based on the aircraft system requirements.

If, at block 824, the example ASMS 100 determines that the aircraft system does not include the second controller model, control proceeds to block 822 to disable the second controller flag. If, at block 824, the example ASMS 100 determines that the aircraft system includes the second controller model, then, at block 826, the ASMS 100 enables a second controller flag and configures the second controller model. For example, the model configurator 200 may enable the second controller flag corresponding to a second controller model and configure the second controller model based on the controller model 320 of FIG. 3 by configuring the initialization state 500, the limited operation state 530, the normal operation state 540, etc., of FIG. 5 of the operational state controller 330 of FIGS. 3 and 5.

At block 828, the example ASMS 100 determines whether the aircraft system includes one or more controller function models. For example, the model configurator 200 may determine that the first aircraft system model 146 of FIG. 1 corresponding to the motor 142 of FIG. 1 includes one or more controller function models based on the aircraft system requirements. If, at block 828, the example ASMS 100 determines that the aircraft system includes one or more controller function models, then, at block 830 the ASMS 100 enables a controller function flag and configures the controller function models. For example, the model configurator 200 may enable the controller function flag and configure the enabled functions 1-N 340, 350, 360 of FIG. 3.

If, at block 828, the example ASMS 100 determines that the aircraft system does not include one or more controller function models, control proceeds to block 832 to disable a controller function flag. For example, the model configurator 200 may disable the controller function flag. In response to disabling the controller function flag, the example method 800 returns to block 706 of the example of FIG. 7 to determine whether to select another aircraft system of interest to model.

Figure 9B:
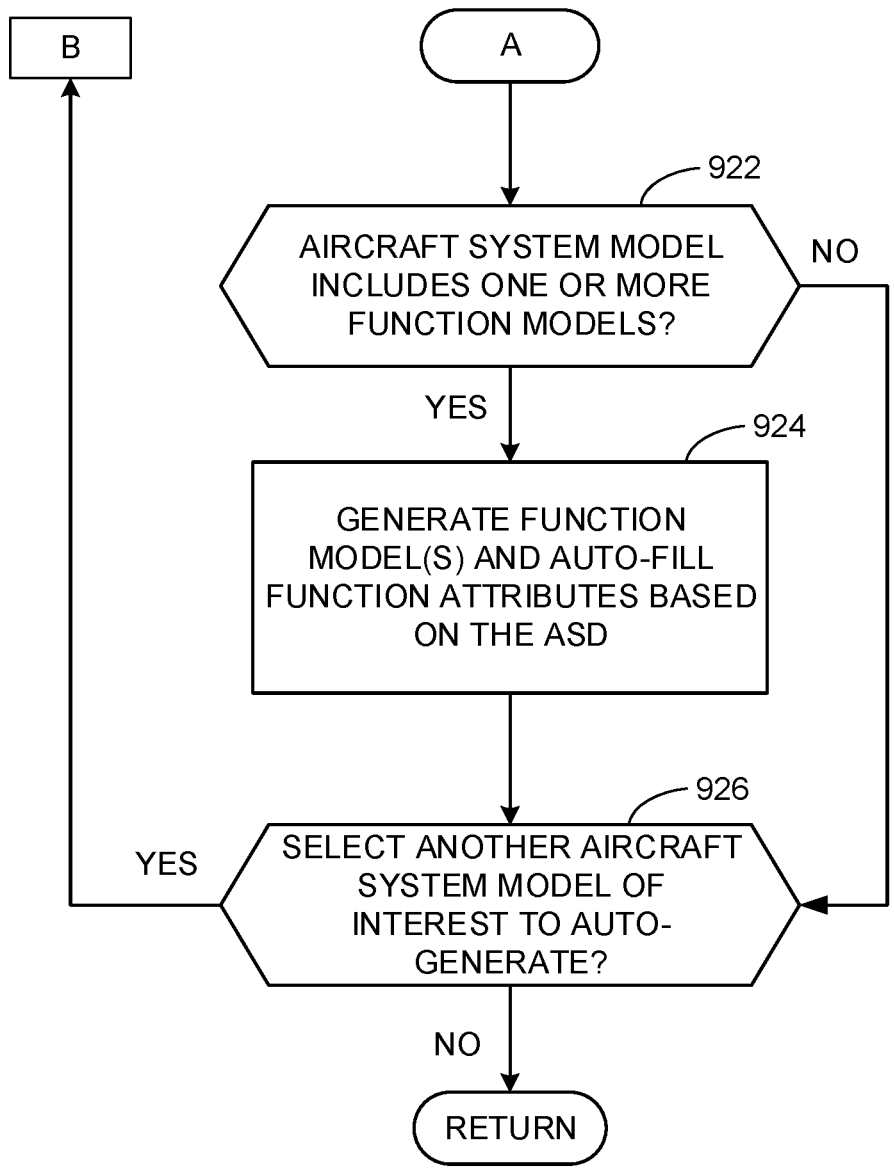

FIGS. 9A-9B illustrate a flowchart representative of an example method 900 that may be performed by the ASMS 100 of FIGS. 1-2 to auto-generate aircraft system model(s) based on a standardized architecture. The example process of FIGS. 9A-9B can be used to implement the operation of block 708 of FIG. 7. The example method 900 begins at block 902 when the example ASMS 100 selects an aircraft system model of interest to auto-generate. For example, the model generator 210 may generate the first aircraft system model 146 of FIG. 1.

At block 904, the example ASMS 100 imports an aircraft system database (ASD). For example, the model generator 210 may import the ASD from the database 280 of FIG. 2 to import the first aircraft system model 146 including the power supply model 150 of FIG. 1, the controller model 152 of FIG. 1, and corresponding attributes and parameters.

At block 906, the example ASMS 100 determines whether the aircraft system model includes a first power supply model. For example, the model generator 210 may determine that the aircraft system model 146 of FIG. 1 includes the power supply model 150 of FIG. 1 based on the first power supply flag being enabled. If, at block 906, the example ASMS 100 determines that the aircraft system model does not include the first power supply model, control proceeds to block 914 to determine whether the aircraft system model includes a first controller model.

If, at block 906, the example ASMS 100 determines that the aircraft system model includes the first power supply model, then, at block 908, the ASMS 100 generates a first power supply model and auto-fills first power supply attributes based on the ASD. For example, the model generator 210 may generate the power supply model 150 of FIG. 1 and assign (e.g., automatically assign) or fill (e.g., automatically fill) the parameters corresponding to the power supply model 150 such as the power input signal 400, the delay on parameters 420, etc., of FIG. 4.

At block 910, the example ASMS 100 determines whether the aircraft system model includes a second power supply model. For example, the model generator 210 may determine that the aircraft system model 146 of FIG. 1 does not include a second power supply model based on the second power supply flag being disabled. If, at block 910, the example ASMS 100 determines that the aircraft system model does not include the second power supply model, control proceeds to block 914 to determine whether the aircraft system model includes a first controller model.

If, at block 910, the example ASMS 100 determines that the aircraft system model includes the second power supply model, then, at block 912, the ASMS 100 generates the second power supply model and auto-fills second power supply attributes based on the ASD. For example, the model generator 210 may generate a second power supply model based on the power supply model 310 of FIGS. 3-4 and assign (e.g., automatically assign) or fill (e.g., automatically fill) the parameters corresponding to the power supply model 310 such as the power input signal 400, the delay on parameters 420, etc., of FIG. 4.

At block 914, the example ASMS 100 determines whether the aircraft system model includes a first controller model. For example, the model generator 210 may determine that the aircraft system model 146 of FIG. 1 includes the controller model 152 based on the first controller flag being enabled. If, at block 914, the example ASMS 100 determines that the aircraft system model does not include the first controller model, control proceeds to block 922 to determine whether the aircraft system model includes one or more function models.

If, at block 914, the example ASMS 100 determines that the aircraft system model includes the first controller model, then, at block 916, the ASMS 100 generates a first controller model and auto-fills first controller attributes based on the ASD. For example, the model generator 210 may generate the controller model 152 of FIG. 1 and assign (e.g., automatically assign) or fill (e.g., automatically fill) the parameters corresponding to the initialization state 500, the operation state 510, etc., of the operational state controller 330 of FIGS. 3 and 5.

At block 918, the example ASMS 100 determines whether the aircraft system model includes a second controller model. For example, the model generator 210 may determine that the aircraft system model 146 of FIG. 1 does not include a second controller model based on the second controller flag being disabled. If, at block 918, the example ASMS 100 determines that the aircraft system model does not include the second controller model, control proceeds to block 922 to determine whether the aircraft system model includes one or more function models.

If, at block 918, the example ASMS 100 determines that the aircraft system model includes the second controller model, then, at block 920, the ASMS 100 generates a second controller model and auto-fills second controller attributes based on the ASD. For example, the model generator 210 may generate a second controller model based on the controller model 320 of FIG. 3 and assign (e.g., automatically assign) or fill (e.g., automatically fill) the parameters corresponding to the initialization state 500, the operation state 510, etc., of the operational state controller 330 of FIGS. 3 and 5.

At block 922, the example ASMS 100 determines whether the aircraft system model includes one or more function models. For example, the model generator 210 may determine that the aircraft system model 146 of FIG. 1 includes the enabled functions 1 340 based on the controller function flag being enabled. If, at block 922, the example ASMS 100 determines that the aircraft system model does not include one or more function models, control proceeds to block 926 to determine whether to select another aircraft system model of interest to auto-generate.

If, at block 922, the example ASMS 100 determines that the aircraft system model includes one or more function models, then, at block 924, the ASMS 100 generates function model(s) and auto-fills function attributes based on the ASD. For example, the model generator 210 may generate the function model 600 of FIG. 6 and assign (e.g., automatically assign) or fill (e.g., automatically fill) the parameters corresponding to the input data acquisition functions 605 (e.g., the input communication interface 630, the input data processor 635, etc.), the input processing functions (e.g., the input signal validator 640, the input signal scaler 645, etc.), etc., of FIG. 6.

At block 926, the example ASMS 100 determines whether to select another aircraft system model of interest to auto-generate. For example, the model generator 210 may determine to select the second aircraft system model 148 corresponding to the motor controller 144. If, at block 926, the example ASMS 100 determines to select another aircraft system model of interest to auto-generate, control returns to block 902 to select another aircraft system model of interest to auto-generate. If, at block 926, the example ASMS 100 determines not to select another aircraft system model of interest to auto-generate, the example method 900 returns to block 710 of the example of FIG. 7 to integrate auto-generated aircraft system models into an integrated aircraft system model.

Figure 10:
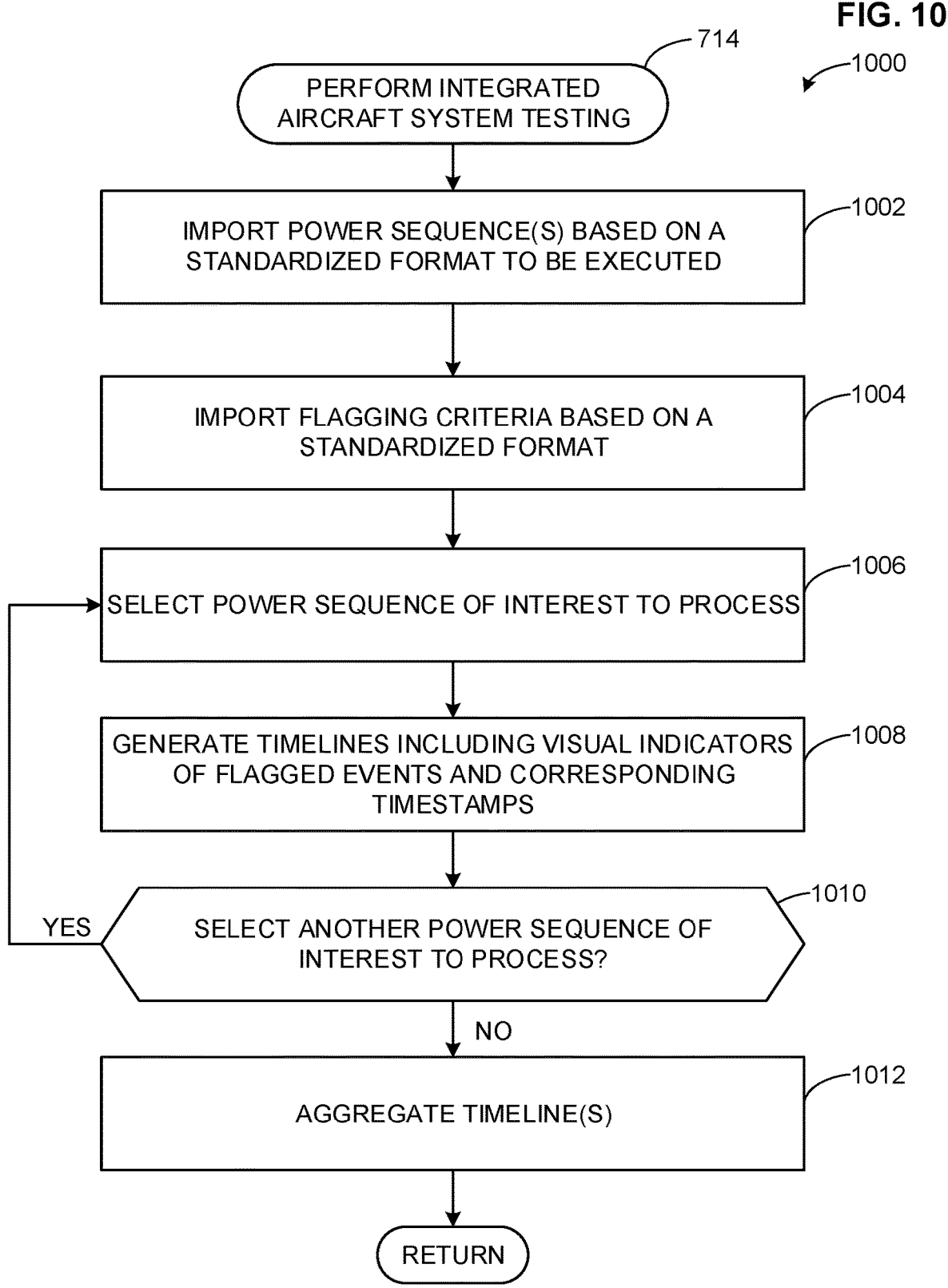

FIG. 10 is a flowchart representative of an example method 1000 that may be performed by the ASMS 100 of FIGS. 1-2 to perform integrated aircraft system testing corresponding to the aircraft 104 of FIG. 1. The example process of FIG. 10 can be used to implement the operation of block 714 of FIG. 7. The example method 1000 begins at block 1002 when the example ASMS 100 imports power sequence(s) based on a standardized format to be executed. For example, the power sequencer 260 may obtain one or more power sequences from the database 280 of FIG. 2 to be executed by an integrated aircraft system model based on a standardized architecture (e.g., the standardized architecture 305 of FIG. 3).

At block 1004, the example ASMS 100 imports flagging criteria based on a standardized format. For example, the power sequencer 260 may obtain flagging criteria from the database 280 corresponding to the one or more obtained power sequences. At block 1006, the example ASMS 100 selects a power sequence of interest to process. For example, the power sequencer 260 may select a power sequence of interest to execute using the integrated aircraft system model 154 of FIG. 1.

At block 1008, the example ASMS 100 generates timelines including visual indicators of flagged events and corresponding timestamps. For example, the power sequencer 260 may generate a timeline including a first visual indicator of a first color at a first timestamp and a second visual indicator of a second color. In such an example, the power sequencer 260 may identify the first and the second visual indicators based on a flagged event such as a detection of a non-responsive condition, a threshold being satisfied (e.g., one or more of the voltage threshold check parameters 410 of FIG. 4 being satisfied, one or more of the delay on parameters 420 of FIG. 4 being satisfied, etc.

At block 1010, the example ASMS 100 determines whether to select another power sequence of interest to process. For example, the power sequencer 260 may select another power sequence of interest to process or may re-execute the selected power sequence. If, at block 1010, the example ASMS 100 determines to select another power sequence of interest to process, control returns to block 1006 to select another power sequence of interest to process. If, at block 1010, the example ASMS 100 determines not to select another power sequence of interest to process, then, at block 1012, the ASMS 100 aggregates timeline(s). For example, the power sequencer 260 may aggregate one or more timelines where each one of the timelines corresponds to an executed power sequence. In response to aggregating the timelines, the example method 1000 returns to block 716 of the example of FIG. 7 to generate a test report (e.g., generate a test report including the aggregated timelines, one or more discrete events, etc.).

Figure 11:
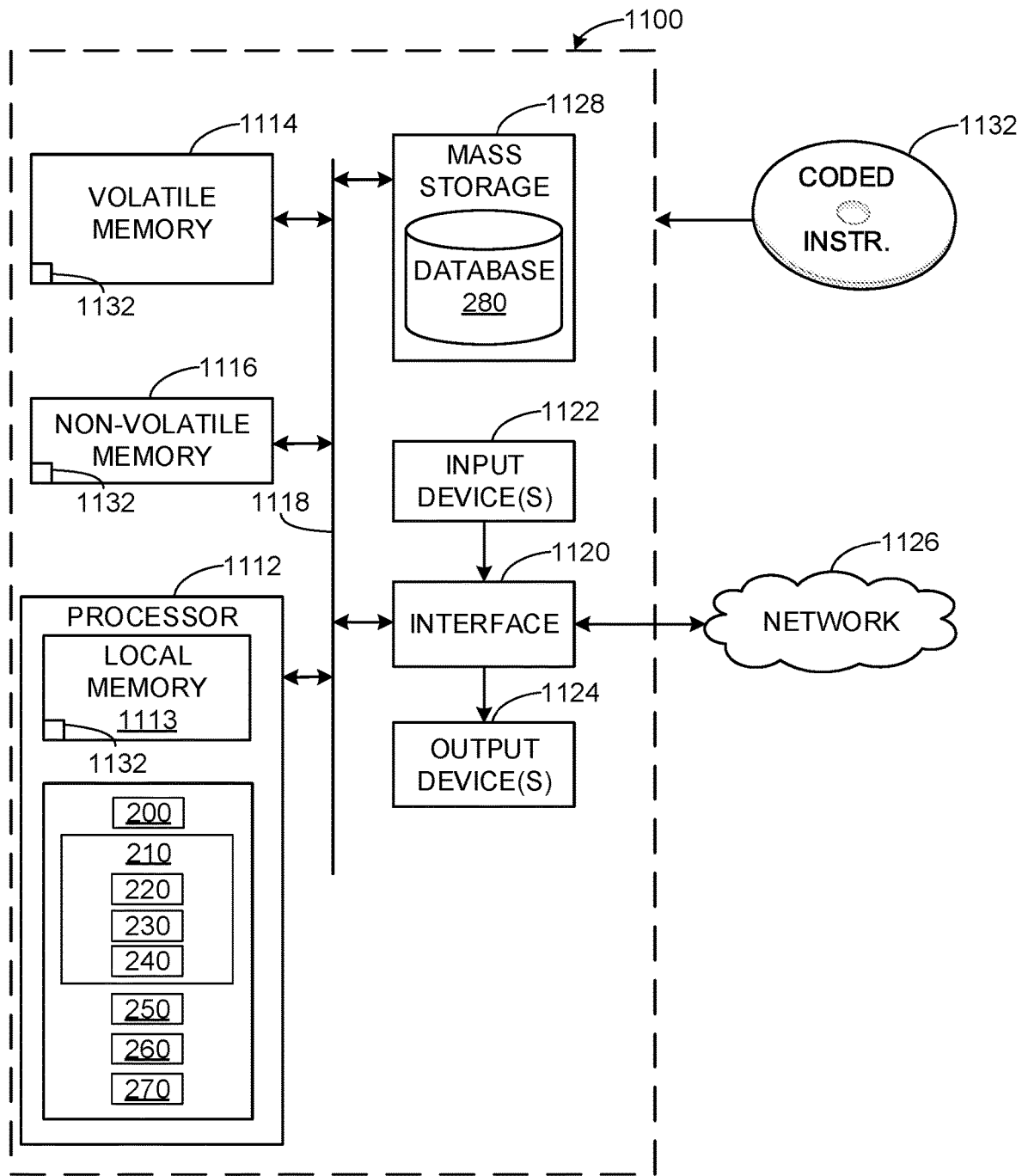
FIG. 11 is a block diagram of an example processing platform structured to execute machine readable instructions to implement the methods of FIGS. 7-10 and/or the example aircraft system model simulator of FIGS. 1-2.

FIG. 11 is a block diagram of an example processor platform 1100 capable of executing instructions to implement the methods of FIGS. 7-10 to implement the ASMS 100 of FIGS. 1-2. The processor platform 1100 can be, for example, a server, a personal computer, a mobile device (e.g., a cell phone, a smart phone, a tablet such as an iPad™, a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example model configurator 200, the example model generator 210, the example power supply model generator 220, the example controller model generator 230, the example function model generator 240, the example model integrator 250, the example power sequencer 260, and the example report generator 270.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAM) systems, and DVD drives.

Coded instructions 1132 to implement the methods of FIGS. 7-10 may be stored in the mass storage device 1128, in the volatile memory 1114, in the non-volatile memory 1116, and/or on a removable non-transitory computer readable storage medium such as a CD or DVD. The example mass storage 1128 implements the example database 280.

From the foregoing, it will be appreciated that example methods, apparatus, systems, and articles of manufacture have been disclosed that generate an aircraft system model using a standardized architecture. The above-disclosed aircraft system model simulator (ASMS) can be used to generate a plurality of aircraft system models using common configurable components, parameters, organization, etc., and integrate the plurality of aircraft system models into an integrated aircraft system model. The above-disclosed ASMS can use the integrated aircraft system model to simulate an operation such as a power-up operation (e.g., an electrical power-up operation, a mechanical power-up operation, an electro-mechanical power-up operation, etc.), a power-down operation (e.g., an electrical power-down operation, a mechanical power-down operation, an electro-mechanical power-down operation, etc.), etc., of the integrated aircraft system model to identify non-responsive conditions or flagged discrete events that can be evaluated to improve a design of the one or more aircraft systems. The above-disclosed ASMS can improve a detection and an evaluation of flagged events by generating color-coded timelines that can include aggregated events to reduce visual clutter of the color-coded timelines.

By using a standardized architecture, validation efforts can be reduced because like components can be readily modeled using a standard set of model blocks, model parameters, etc. By using the standardized architecture an integration of the aircraft system models can be improved because the aircraft system models have the same or substantially compatible configurable parameters. Computing power and memory can be reduced because intricate models that are computationally intensive can be replaced with less intricate, standard models designed to be compatible with other models based on the less intricate, standard models.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. An apparatus comprising:
   a model generator to:
      generate an aircraft system model of an aircraft system based on a standardized architecture;
      generate at least one of a power supply model, a controller model, or a controller function model of the aircraft system model; and
      populate an attribute of at least one of the power supply model, the controller model, or the controller function model based on a database;
   a model integrator to integrate the aircraft system model into an integrated aircraft system model;
   a power sequencer to perform a power sequence test on the integrated aircraft system model by executing the controller function model, the controller function model to execute one or more functions including at least one of an input data acquisition function, an input processing function, a system component function, an output processing function, or an output data acquisition function, the power sequencer to execute the controller function model to:
      execute the input data acquisition function by obtaining a data packet and processing the data packet by extracting an input signal from the data packet;
      execute the input processing function by validating an input signal and in response to validating the input signal, scaling the input signal;
      execute the system component function by calculating a parameter value based on a scaled input signal and in response to calculating the parameter value, generating an output signal based on the calculated parameter value;
      execute the output processing function by validating an output signal and in response to validating the output signal, scaling the output signal; and
   execute the output data acquisition function by generating a data packet including an output signal and transmitting the data packet; and
   a report generator to generate a report including a result of the power sequence test, at least one of the model generator, the model integrator, the power sequencer, or the report generator implemented with hardware.

2. The apparatus of claim 1, further including a model configurator to configure the aircraft system model by:
   assigning the power supply model to the aircraft system model based on determining that the aircraft system includes the power supply model;
   assigning the controller model to the aircraft system model based on determining that the aircraft system includes the controller model;
   assigning the controller function model to the aircraft system model based on determining that the controller model includes the controller function model; and
   generating the aircraft system model based on the assignments.

3. The apparatus of claim 1, wherein the power supply model includes at least one of a voltage threshold check parameter, a delay on parameter, or a delay off parameter.

4. The apparatus of claim 3, wherein at least one of:
   the voltage threshold check parameter is a low-power threshold parameter, a high-power threshold parameter, or a power type parameter;
   the delay on parameter is a delay on time parameter, a tolerance for a delay on time parameter, or a delay on time design validation parameter; or
   the delay off parameter is a delay off time parameter, a tolerance for a delay off time parameter, or a delay off time design validation parameter.

5. The apparatus of claim 1, wherein the controller model includes one or more function states including at least one of an initialization state, a fail-safe state, or an operation state, the operation state including at least one of a limited operation state or a normal operation state.

6. The apparatus of claim 5, wherein the initialization state and the fail-safe state include a sub-set of functions associated with the operation state, wherein the fail-safe state is triggered based on a non-responsive power event of a component in the aircraft system when the aircraft system is in at least one of the initialization state or the operation state.

7. The apparatus of claim 1, wherein the power sequencer is to perform the power sequence test on the integrated aircraft system model by:
   determining a power sequence based on a first standardized format;
   determining flagging criteria for the power sequence based on a second standardized format;
   executing the power sequence;
   generating a timeline of the executed power sequence; and
   in response to the timeline including a flagged event:
      generating a visual indicator of the flagged event; and
      assigning a corresponding timestamp to the visual indicator.

8. A computer implemented method comprising:
   generating an aircraft system model of an aircraft system based on a standardized architecture;
   generating at least one of a power supply model, a controller model, or a controller function model of the aircraft system model;
   populating an attribute of at least one of the power supply model, the controller model, or the controller function model based on a database;
   integrating the aircraft system model into an integrated aircraft system model;
   performing a power sequence test on the integrated aircraft system model by executing the controller function model, the controller function model to execute one or more functions including at least one of an input data acquisition function, an input processing function, a system component function, an output processing function, or an output data acquisition function, executing the controller function model including:
      executing the input data acquisition function by obtaining a data packet and processing the data packet by extracting an input signal from the data packet;
      executing the input processing function by validating an input signal and in response to validating the input signal, scaling the input signal;
      executing the system component function by calculating a parameter value based on a scaled input signal and in response to calculating the parameter value, generating an output signal based on the calculated parameter value;

executing the output processing function by validating an output signal and in response to validating the output signal, scaling the output signal; and
executing the output data acquisition function by generating a data packet including an output signal and transmitting the data packet; and
generating a report including a result of the power sequence test.

9. The method of claim 8, further including configuring the aircraft system model by:
assigning the power supply model to the aircraft system model based on determining that the aircraft system includes the power supply model;
assigning the controller model to the aircraft system model based on determining that the aircraft system includes the controller model;
assigning the controller function model to the aircraft system model based on determining that the controller model includes the controller function model; and
generating the aircraft system model based on the assignments.

10. The method of claim 8, wherein the power supply model includes at least one of a voltage threshold check parameter, a delay on parameter, or a delay off parameter.

11. The method of claim 10, wherein at least one of:
the voltage threshold check parameter is a low-power threshold parameter, a high-power threshold parameter, or a power type parameter;
the delay on parameter is a delay on time parameter, a tolerance for a delay on time parameter, or a delay on time design validation parameter; or
the delay off parameter is a delay off time parameter, a tolerance for a delay off time parameter, or a delay off time design validation parameter.

12. The method of claim 8, wherein the controller model includes one or more function states including at least one of an initialization state, a fail-safe state, or an operation state, the operation state including at least one of a limited operation state or a normal operation state.

13. The method of claim 12, wherein the initialization state and the fail-safe state include a sub-set of functions associated with the operation state, wherein the fail-safe state is triggered based on a non-responsive power event of a component in the aircraft system when the aircraft system is in at least one of the initialization state or the operation state.

14. The method of claim 8, wherein performing the power sequence test on the integrated aircraft system model includes:
determining a power sequence based on a first standardized format;
determining flagging criteria for the power sequence based on a second standardized format;
executing the power sequence;
generating a timeline of the executed power sequence; and
in response to the timeline including a flagged event:
generating a visual indicator of the flagged event; and
assigning a corresponding timestamp to the visual indicator.

15. A non-transitory computer readable storage medium comprising instructions that, when executed, cause a machine to at least:
generate an aircraft system model of an aircraft system based on a standardized architecture;
integrate the aircraft system model into an integrated aircraft system model;
perform a power sequence test on the integrated aircraft system model, the power sequence test to:
execute a system component function by calculating a parameter value based on a scaled input signal and in response to calculating the parameter value, generating an output signal based on the calculated parameter value;
execute an output processing function by validating an output signal and in response to validating the output signal, scaling the output signal; and
execute an output data acquisition function by generating a data packet including an output signal and transmitting the data packet; and
generate a report including a result of the power sequence test.

16. The non-transitory computer readable storage medium of claim 15, wherein the power sequence test is to:
execute an input data acquisition function including obtaining a data packet and processing the data packet by extracting an input signal from the data packet; and
execute an input processing function including validating an input signal and in response to validating the input signal, scaling the input signal.

17. The non-transitory computer readable storage medium of claim 15, wherein the instructions, when executed, cause the machine to:
determine a power sequence based on a first standardized format;
determine flagging criteria for the power sequence based on a second standardized format;
execute the power sequence;
generate a timeline of the executed power sequence; and
in response to the timeline including a flagged event:
generate a visual indicator of the flagged event; and
assign a corresponding timestamp to the visual indicator.

18. The non-transitory computer readable storage medium of claim 15, wherein the instructions, when executed, cause the machine to:
assign a power supply model to the aircraft system model based on determining that the aircraft system includes the power supply model;
assign a controller model to the aircraft system model based on determining that the aircraft system includes the controller model;
assign a controller function model to the aircraft system model based on determining that the controller model includes the controller function model; and
generate the aircraft system model based on the assignments.

19. The non-transitory computer readable storage medium of claim 15, wherein the instructions, when executed, cause the machine to:
generate at least one of a power supply model, a controller model, or a controller function model; and
populate an attribute of at least one of the power supply model, the controller model, or the controller function model based on a database.

20. An apparatus comprising:
at least one processor;
memory including instructions that, when executed, cause the at least one processor to:
generate a first aircraft system model of a first aircraft system based on an architecture;
integrate the first aircraft system model into an integrated aircraft system model by configuring one or more output signals of the first aircraft system model to be transmitted to a second aircraft system model of a second aircraft system as one or more input signals, the integrated aircraft system model representative of an aircraft including the first aircraft system and the second aircraft system;

execute a power sequence test on the integrated aircraft system model, the power sequence test to:

determine flagging criteria for the power sequence test;

execute a power sequence to invoke the first aircraft system model to transmit the one or more output signals to the second aircraft system model;

generate a timeline of the executed power sequence based on at least one of the one or more input signals and the one or more output signals; and validate at least one of the first aircraft system model or the second aircraft system model for manufacturing in response to the timeline not including a flagged event based on the flagging criteria.

\* \* \* \* \*